(12) United States Patent
Lubensky

(10) Patent No.: US 12,039,405 B2
(45) Date of Patent: *Jul. 16, 2024

(54) BOOSTING QUANTUM ARTIFICIAL INTELLIGENCE MODELS

(71) Applicant: International Business Machines Corporation, Armonk, NY (US)

(72) Inventor: David M. Lubensky, Brookfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,912

(22) Filed: Nov. 18, 2022

(65) Prior Publication Data

US 2024/0005184 A1    Jan. 4, 2024

Related U.S. Application Data

(63) Continuation of application No. 16/378,190, filed on Apr. 8, 2019, now Pat. No. 11,568,294.

(51) Int. Cl.
*G06N 10/00* (2022.01)
*G06F 15/16* (2006.01)
(Continued)

(52) U.S. Cl.
CPC ............. *G06N 10/00* (2019.01); *G06F 15/16* (2013.01); *G06F 17/18* (2013.01); *G06F 18/214* (2023.01);
(Continued)

(58) Field of Classification Search
CPC ........ G06F 15/16; G06F 17/18; G06F 18/214; G06F 18/2148; G06F 18/2411;
(Continued)

(56) References Cited

U.S. PATENT DOCUMENTS 11,568,294 B2 *  1/2023  Lubensky ............... G06F 17/18
2007/0239366 A1  10/2007  Hilton et al.
(Continued)

FOREIGN PATENT DOCUMENTS

WO       2017189052 A1    11/2017

OTHER PUBLICATIONS

Wang et al., "The Hybrid Quantum Trajectory/Electronic Structure DFTB-based Approach to Molecular Dynamics", Proceedings of the 2014 Annual Conference on Extreme Science and Engineering Discovery Environment, Jul. 18, 2014, 8 pages.
(Continued)

*Primary Examiner* — Terrell S Johnson
(74) *Attorney, Agent, or Firm* — Amin, Turocy & Watson, LLP

(57) ABSTRACT

Systems, computer-implemented methods, and computer program products that can facilitate a classical and quantum ensemble artificial intelligence model are described. According to an embodiment, a system can comprise a memory that stores computer executable components and a processor that executes the computer executable components stored in the memory. The computer executable components can comprise an ensemble component that generates an ensemble artificial intelligence model comprising a classical artificial intelligence model and a quantum artificial intelligence model. The computer executable components can further
(Continued)

comprise a score component that computes probability scores of a dataset based on the ensemble artificial intelligence model.

20 Claims, 17 Drawing Sheets

(51) Int. Cl.
| | |
|---|---|
| *G06F 17/18* | (2006.01) |
| *G06F 18/214* | (2023.01) |
| *G06F 18/2411* | (2023.01) |
| *G06F 18/40* | (2023.01) |
| *G06N 20/00* | (2019.01) |
| *G06N 20/10* | (2019.01) |
| *G06N 20/20* | (2019.01) |

(52) U.S. Cl.
CPC ......... *G06N 20/00* (2019.01); *G06F 18/2148* (2023.01); *G06F 18/2411* (2023.01); *G06F 18/40* (2023.01); *G06N 20/10* (2019.01); *G06N 20/20* (2019.01)

(58) Field of Classification Search
CPC ........ G06F 18/40; G06N 10/00; G06N 20/00; G06N 20/10; G06N 20/20
See application file for complete search history.

(56) References Cited

U.S. PATENT DOCUMENTS

| | | |
|---|---|---|
| 2008/0313430 A1 | 12/2008 | Bunyk |
| 2017/0364796 A1 | 12/2017 | Wiebe et al. |
| 2018/0349605 A1 | 12/2018 | Wiebe et al. |
| 2019/0251213 A1* | 8/2019 | Bishop .............. G06F 30/20 |
| 2021/0049498 A1* | 2/2021 | Liu .............. G06N 20/00 |

OTHER PUBLICATIONS

Crum et al., "Semi-Classical Ensemble Monte Carlo Simulator Using Innovative Quantum Corrections for Nano-Scale n-Channel FinFETs", 2014 International Conference on Simulation of Semiconductor Processes and Devices (SISPAD), Oct. 2014, pp. 109-112.

Lau et al., "Quantum Machine Learning Over Infinite Dimensions", arXiv:1603.06222v2 [quant-ph], Nov. 24, 2016, 9 pages.

Freund et al., "A Short Introduction to Boosting", Journal of Japanese Society for Artificial Intelligence, Sep. 1999, 14 pages.

Rahimi et al., "Random Features for Large-Scale Kernel Machines", Advances in Neural Information Processing Systems, vol. 20, Dec. 6, 2007, 8 pages.

Havlicek et al., "Supervised Learning With Quantum Enhanced Feature Spaces", arXiv:1804.11326v2 [quant-ph], Jun. 7, 2018, 22 pages.

Alpaydin et al., "Pen-Based Recognition of Handwritten Digits Data Set", UGI Machine Learning Repository, http://archive.ics.uci.edu/ml/datasets/pen-based+recognition+of+handwritten+digits, Last Accessed Mar. 11, 2019, 3 pages.

Forina et al., "Wine Data Set", UGI Machine Learning Repository, https://archive.ics.uci.edu/ml/datasets/wine, Last Accessed Mar. 11, 2019, 4 pages.

Fisher, R.A., "Iris Data Set", UCI Machine Learning Repository, https://archive.ics.uci.edu/ml/datasets/iris, Last Accessed Mar. 11, 2019, 7 pages.

Wolberg et al., "Breast Cancer Wisconsin (Diagnostic) Data Set", UCI Machine Learning Repository, https://archive.cs.uci.edu/ml/datasets/breast+cancer+wisconsin+(diagnostic), Last Accessed Mar. 11, 2019, 5 pages.

Notice of Allowance received for U.S. Appl. No. 16/378,190 dated Sep. 16, 2022, 40 pages.

List of IBM Patents or Applications Treated as Related.

* cited by examiner

Algorithm:

1. Input: a set of training samples with labels $\{(x_1, y_1), \ldots, (x_N, y_N)\}$, a ComponentLearn algorithm, the number of cycles $T$.

2. Initialize: the weights of training samples: $w_i^1 = 1/N$, for all $i = 1, \ldots, N$.

3. Do for $t = 1, \ldots, T$
   (1) Use the ComponentLearn algorithm to train a component classifier, $h_t$, on the weighted training samples.
   (2) Calculate the training error of $h_t$: $\varepsilon_t = \sum_{i=1}^{N} w_i^t$, $y_i \neq h_t(x_i)$.
   (3) Set weight for the component classifier $h_t$: $\alpha_t = \frac{1}{2} \ln(\frac{1-\varepsilon_t}{\varepsilon_t})$.
   (4) Update the weights of training samples: $w_i^{t+1} = \frac{w_i^t \exp\{-\alpha_t y_i h_t(x_i)\}}{C_t}$, $i = 1, \ldots, N$
   where $C_t$ is a normalization constant, and $\sum_{i=1}^{N} w_i^{t+1} = 1$.

4. Output: $f(x) = \text{sign}(\sum_{t=1}^{T} \alpha_t h_t(x))$.

FIG. 3

```
def run(self):
    """
    put the train, test, predict together
    """
    kernel_matrix_test = self.construct_kernel_matrix(self.test_dataset[0])
    kernel_matrix_test = self.construct_kernel_matrix(self.test_dataset[0],self.training_dataset[0])
    kernel_matrix_train = self.construct_kernel_matrix(self.training_dataset[0])

self._ret['kernel_matrix_train'] = kernel_matrix_train
    self._ret['kernel_matrix_test'] = kernel_matrix_test
```

FIG. 7A

```
#custom kernel - sample implementation of evaluating kernel methods
def my_kernel(x, y):
    if TRAINING_FLAG :
        return SVM_TRAINING_KERNEL
    elif TESTING_FLAG :
        return SVM_TESTING_KERNEL
    else :
        print('Error: training/testing flags are not set!')
```

FIG. 7B

```
q_bdt = AdaBoostClassifier(n_estimators=i,
        random_state=0,base_estimator=SVC(probabiliy=True,
kernel=my_kernel))
TRAINING_FLAG = True
TESTING_FLAG = False
q_bdt.fit(samples_train,labels_train)
q_accuracy_train=
        q_bdt.score(samples_train,labels_train)
TRAINING_FLAG = False
TESTING_FLAG = True
q_accuracy_test=
        q_bdt.score(samples_test,labels_test)
```

```
ensamble_clf_boost = VotingClassifier(estimators=[  ('svm',
bdtsvm_boost),
        ('qsvc_kernel', q_bdt)],
        voting='soft', weights=[2.5, 1])
```

BOOSTING QUANTUM ARTIFICIAL INTELLIGENCE MODELS

BACKGROUND

The subject disclosure relates to artificial intelligence models, and more specifically, to boosting quantum artificial intelligence models.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, and/or computer program products that can facilitate a classical and quantum ensemble artificial intelligence model are described.

According to an embodiment, a system can comprise a memory that stores computer executable components and a processor that executes the computer executable components stored in the memory. The computer executable components can comprise an ensemble component that generates an ensemble artificial intelligence model comprising a classical artificial intelligence model and a quantum artificial intelligence model. The computer executable components can further comprise a score component that computes probability scores of a dataset based on the ensemble artificial intelligence model.

According to another embodiment, a computer-implemented method can comprise generating, by a system operatively coupled to a processor, an ensemble artificial intelligence model comprising a classical artificial intelligence model and a quantum artificial intelligence model. The computer-implemented method can further comprise computing, by the system, probability scores of a dataset based on the ensemble artificial intelligence model.

According to another embodiment, a computer program product that can facilitate a classical and quantum ensemble artificial intelligence model. The computer program product can comprise a computer readable storage medium having program instructions embodied therewith, the program instructions can be executable by a processor to cause the processor to generate, by the processor, an ensemble artificial intelligence model comprising a classical artificial intelligence model and a quantum artificial intelligence model. The program instructions can be further executable by the processor to cause the processor to compute, by the system, probability scores of a dataset based on the ensemble artificial intelligence model.

DESCRIPTION OF THE DRAWINGS

FIG. 3 illustrates an example, non-limiting algorithm that can facilitate a classical and quantum ensemble artificial intelligence (AI) model in accordance with one or more embodiments described herein.

FIGS. 7A, 7B, 7C, and 7D illustrate example, non-limiting scripts that can facilitate a classical and quantum ensemble artificial intelligence (AI) model in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It is noted that the drawings of the present application are provided for illustrative purposes only and, as such, the drawings are not drawn to scale.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits (qubits), and use interference.

Classical artificial intelligence (AI) and/or machine learning (ML) systems and/or techniques scale well to large datasets. However, there are limitations to scaling quantum artificial intelligence (AI) and/or quantum machine learning (ML) systems and/or techniques on near term quantum computers primarily due to the time it takes to load data, number of qubits, and/or depth of quantum circuit. As referenced herein, an artificial intelligence (AI) model can comprise a machine learning (ML) model.

Figure 1:
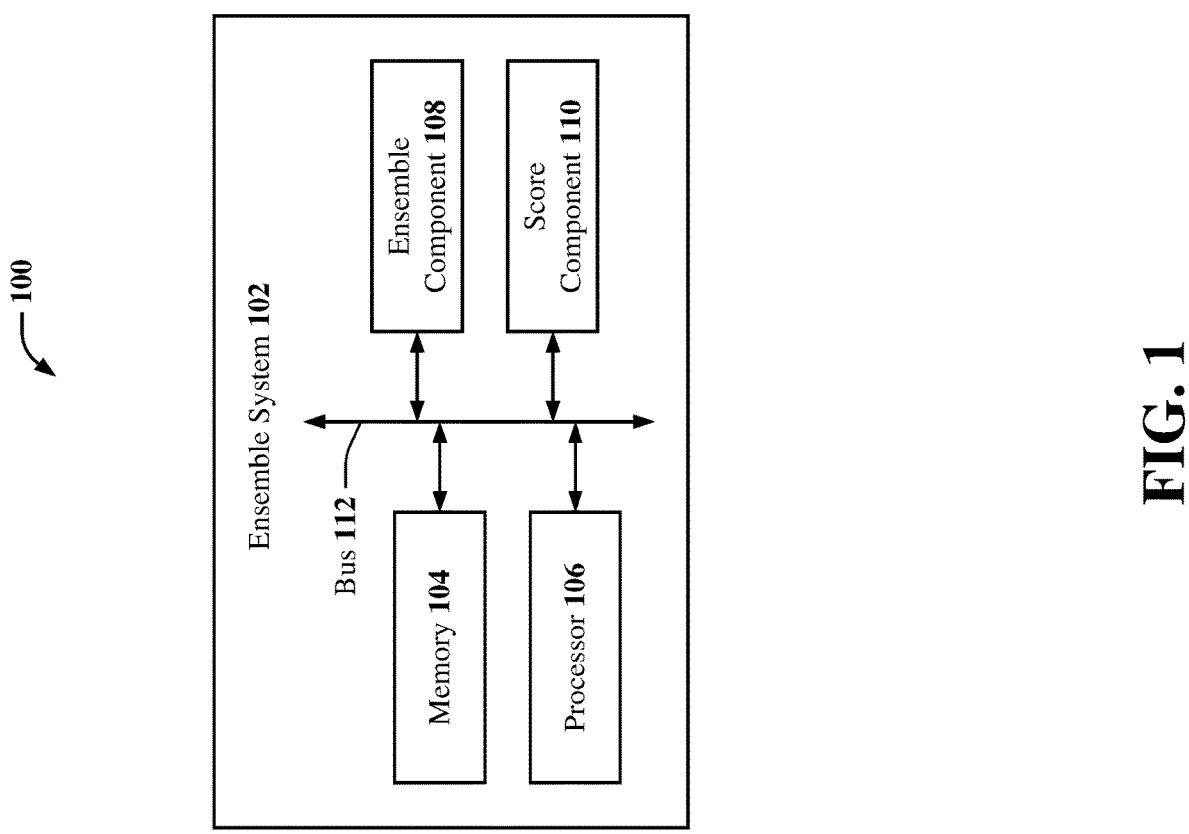
FIG. 1 illustrates a block diagram of an example, non-limiting system that can facilitate a classical and quantum ensemble artificial intelligence (AI) model in accordance with one or more embodiments described herein.

FIG. 1 illustrates a block diagram of an example, non-limiting system 100 that can facilitate a classical and quantum ensemble artificial intelligence (AI) model in accordance with one or more embodiments described herein. According to several embodiments, system 100 can comprise an ensemble system 102. In some embodiments, ensemble system 102 can comprise a memory 104, a processor 106, an ensemble component 108, a score component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or ensemble system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to ensemble system 102, ensemble component 108, score component 110, and/or another component associated with system 100 and/or ensemble system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, ensemble system 102, memory 104, processor 106, ensemble component 108, score component 110, and/or another component of ensemble system 102 as described herein can be communicatively, electrically, and/or operatively coupled to one another via a bus 112 to perform functions of system 100, ensemble system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, ensemble system 102 can comprise any type of component, machine, device, facility, apparatus, and/or instrument that comprises a processor and/or can be capable of effective and/or operative communication with a wired and/or wireless network. All such embodiments are envisioned. For example, ensemble system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, ensemble system 102 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, ensemble system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and wireless networks, including, but not limited to, a cellular network, a wide area network (WAN) (e.g., the Internet) or a local area network (LAN). For example, ensemble system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, ensemble system 102 can thus include hardware (e.g., a central processing unit (CPU), a transceiver, a decoder), software (e.g., a set of threads, a set of processes, software in execution) or a combination of hardware and software that facilitates communicating information between ensemble system 102 and external systems, sources, and/or devices (e.g., computing devices, communication devices, etc.).

According to multiple embodiments, ensemble system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with ensemble system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, ensemble component 108, score component 110, and/or any other components associated with ensemble system 102 as disclosed herein (e.g., communicatively, electronically, and/or operatively coupled with and/or employed by ensemble system 102), can comprise such computer and/or machine readable, writable, and/or executable component(s) and/or instruction(s). Consequently, according to numerous embodiments, ensemble system 102 and/or any components associated therewith as disclosed herein, can employ processor 106 to execute such computer and/or machine readable, writable, and/or executable component(s) and/or instruction(s) to facilitate performance of one or more operations described herein with reference to ensemble system 102 and/or any such components associated therewith.

In some embodiments, ensemble system 102 can facilitate performance of operations executed by and/or associated with ensemble component 108, score component 110, and/or another component associated with ensemble system 102 as disclosed herein. For example, as described in detail below, ensemble system 102 can facilitate: generating an ensemble artificial intelligence (AI) model comprising a classical AI model and a quantum AI model; and/or computing probability scores of a dataset based on the ensemble AI model. In some embodiments, such a classical AI model and/or a quantum AI model can comprise a boosted AI model comprising two or more AI models. In some embodiments, ensemble system 102 can further facilitate: computing a quantum kernel and/or one or more quantum support vectors; computing a classical kernel and/or one or more classical support vectors; computing one or more classical support vectors based on a classical kernel and/or a quantum kernel; training a classical AI model based on training data; training a quantum AI model based on a subset of training data; generating a boosted classical AI model comprising two or more classical AI models and/or a boosted quantum AI model comprising two or more quantum AI models; and/or computing probability scores of a dataset based on a classical AI model or a quantum AI model.

In some embodiments, to facilitate performance of such operations described above, ensemble system 102 and/or one or more components thereof can employ one or more kernel methods and/or one or more support vector machines (SVM) in classical and/or quantum AI models. For example, as described in detail below, to facilitate generating an ensemble AI model comprising a classical AI model and a quantum AI model and/or computing probability scores of a dataset based on the ensemble AI model, ensemble system 102 and/or one or more components thereof can compute a quantum kernel using a quantum computer (e.g., via a quantum kernel library). In this example, ensemble system 102 and/or one or more components thereof can export such a quantum kernel matrix to a classical system to compute support vectors. In this example, ensemble system 102 and/or one or more components thereof can employ a radial basis function (RBF) kernel to compute a classical kernel and/or one or more support vectors. In this example, ensemble system 102 and/or one or more components thereof can employ a boosting technique (e.g., a boosting algorithm) to boost one or more classical AI models and/or one or more quantum AI models. In this example, ensemble system 102 and/or one or more components thereof can employ a boosting technique (e.g., a boosting algorithm) to generate an ensemble AI model comprising one or more classical AI models and one or more quantum AI models. In this example, ensemble system 102 and/or one or more components thereof can compute probability scores of the classical and/or quantum AI models. In this example, ensemble system 102 and/or one or more components thereof can employ a quantum computer to compute the dot product between unknown and support vectors corresponding to one or more quantum AI models. In this example, ensemble system 102 and/or one or more components thereof can combine probability scores from classical and/or quantum models using a weighting scheme.

In some embodiments, ensemble system 102 can be implemented to generate and/or execute one or more boosted AI models and/or one or more ensemble AI models to discover effective data representation of classical and/or quantum AI learning models. In some embodiments, ensemble system 102 can be implemented to generate and/or execute a classical AI model to identify one or more complex training datasets and/or complex classification tasks that cannot be executed efficiently and/or effectively by such a classical AI model (e.g., due to computational cost). In these embodiments, based on such identification, ensemble system 102 can generate and/or execute a quantum AI model to classify such complex training dataset(s) and/or perform such complex classification task(s). In some embodiments, ensemble system 102 can be implemented to apply a fast-match approach using only one or more classical AI models or only one or more quantum AI models to reduce search space (e.g., to reduce 100 classes to 10 classes, thereby reducing the amount of data (e.g., features) that must be input to a quantum computer). In these embodiments, based on such reduction of search space, ensemble system 102 can apply a detailed-match approach by generating and/or implementing an ensemble AI model comprising one or more classical AI models and/or one or more quantum AI models to make a final decision using high-dimensional computation techniques of a quantum computing device. In some embodiments, ensemble system 102 can scale to large training datasets by generating and/or implementing one or more classical AI models to process most of the data and generating and/or implementing one or more quantum AI models selectively based on some outcomes or subsampling.

According to multiple embodiments, ensemble component 108 can generate an ensemble AI model comprising one or more classical AI models and one or more quantum AI models. For example, ensemble component 108 can generate an ensemble AI model comprising a classical AI model and a quantum AI model by employing boost component 208 described below with reference to FIG. 2 and/or by employing a boosting technique (e.g., a boosting algorithm such as, for instance, algorithm 300 illustrated in FIG. 3). As referenced herein, boosting can comprise a sequential technique which works on the principle of ensemble (e.g., the combination of one or more individual components to create a single component). For example, as referenced herein, boosting can comprise a sequential technique that can be implemented (e.g., by ensemble component 108) to combine two or more AI models (also referred to as learners or classifiers) into a single AI model.

In some embodiments, ensemble component 108 can generate an ensemble AI model comprising a classical AI model and a quantum AI model, where such a classical AI model and/or quantum AI model can comprise a boosted AI model that can comprise two or more AI models. For example, ensemble component 108 can generate an ensemble AI model comprising a boosted classical AI model and a boosted quantum AI model, where such a boosted classical AI model can comprise two or more classical AI models and such a boosted quantum AI model can comprise two or more quantum AI models. In another example, ensemble component 108 can generate an ensemble AI model comprising a boosted classical AI model and a quantum AI model, where such a boosted classical AI model can comprise two or more classical AI models. In another example, ensemble component 108 can generate an ensemble AI model comprising a classical AI model and a boosted quantum AI model, where such a boosted quantum AI model can comprise two or more quantum AI models.

In some embodiments, to generate one or more of such ensemble AI models described above, ensemble component 108 can implement a boosting technique (e.g., a boosting algorithm such as, for instance, algorithm 300 illustrated in FIG. 3) to combine one or more classical and/or quantum AI models, where such classical AI model(s) can be trained on the bulk of available training data and/or such quantum AI model(s) can be trained on a subset of such available training data. For example, ensemble system 102 and/or ensemble component 108 can employ trainer component 206 described below with reference to FIG. 2 to train such classical AI model(s) on the bulk of available training data and/or train such quantum AI model(s) on a subset of such available training data.

According to multiple embodiments, score component 110 can compute probability scores of a dataset based on an ensemble AI model. For example, score component 110 can compute probability scores of a dataset based on an ensemble AI model that can be generated by ensemble component 108 as described above. In some embodiments, to facilitate such computation of probability scores of a dataset based on an ensemble AI model, score component 110 can compute probability scores of the dataset based on a classical AI model and/or a quantum AI model. For example, to facilitate such computation of probability scores of a dataset based on an ensemble AI model, score component 110 can compute probability scores of the dataset based on a classical AI model and/or a quantum AI model of such ensemble AI model. In this example, score component 110 can compute probability scores of the dataset based on a classical AI model using one or more classical probability scoring techniques. In this example, score component 110 can compute probability scores of the dataset based on a quantum AI model using one or more quantum probability scoring techniques. In these examples, score component 110 can combine such probability scores based on generation of the ensemble AI model (e.g., via ensemble component 108), thereby facilitating computation of probability scores of a dataset based on an ensemble AI model. For instance, score component 110 can compute probability scores of a dataset based on a classical AI model, a quantum AI model, and/or an ensemble AI model which can be presented in the form of a table such as, for example, table 800a depicted in FIG. 8A and/or in the form of a matrix such as, for example, matrix 800b and/or matrix 800c depicted in FIGS. 8B and 8C, respectively.

Figure 2:
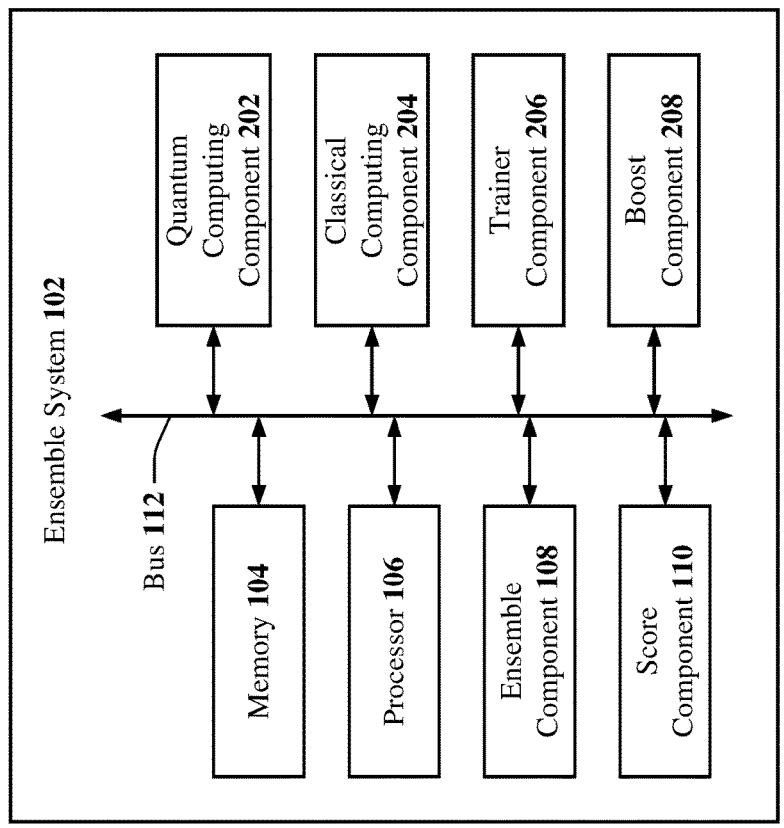
FIG. 2 illustrates a block diagram of an example, non-limiting system that can facilitate a classical and quantum ensemble artificial intelligence (AI) model in accordance with one or more embodiments described herein.

FIG. 2 illustrates a block diagram of an example, non-limiting system 200 that can facilitate a classical and quantum ensemble artificial intelligence (AI) model in accordance with one or more embodiments described herein. Repetitive description of like elements and/or processes employed in respective embodiments is omitted for sake of brevity. In some embodiments, system 200 can comprise ensemble system 102. In some embodiments, ensemble system 102 can comprise a quantum computing component 202, a classical computing component 204, a trainer component 206, and/or a boost component 208.

According to multiple embodiments, quantum computing component 202 can comprise a quantum computing device including, but not limited to, a quantum computer, a quantum processor, a quantum circuit, a superconducting circuit, a simulated quantum computer (e.g., software executed on a classical computer that simulates one or more operations of a quantum computer), and/or another quantum computing device. In some embodiments, quantum computing component 202 can compute a quantum kernel and/or one or more quantum support vectors. In some embodiments, as described above with reference to FIG. 1, ensemble system 102 and/or one or more components thereof can employ one or more kernel methods and/or one or more support vector machines (SVM) in classical and/or quantum AI models. For example, to facilitate generating an ensemble AI model comprising a classical AI model and a quantum AI model and/or computing probability scores of a dataset based on the ensemble AI model, quantum computing component 202 can compute a quantum kernel (e.g., a quantum kernel matrix) using a quantum kernel library and can further compute one or more quantum support vectors.

As referenced herein, a kernel method can map data of a dataset into higher dimensional spaces to facilitate improved separation (e.g., classification) of such data. In some embodiments, based on a pair of data points x and z, a kernel function k can be defined as $k(x,z)=\phi(x)^T\phi(z)$, where $\phi$ can be a feature map function, and T can be a transpose of a vector. In these embodiments, there are no constraints on the form of this mapping $\phi(x)$ could be infinite. In some embodiments, quantum computing component 202 can compute the dot product between unknown and support vectors corresponding to one or more quantum AI models. In some embodiments, quantum computing component 202 can compute inner products that can provide a measure of similarity. In some embodiments, such inner product in a two-dimensional (2D) space between 2 vectors of unit length can return the cosine of the angle between such vectors, which can indicate how far apart they are. For instance, if they are parallel, their inner product is 1 (e.g., completely similar). Conversely, in another example, if they are perpendicular (e.g., completely dissimilar) their inner product is 0, and thus, should not contribute to the correct AI model (e.g. classifier, learner).

In some embodiments, ensemble system 102 (e.g., quantum computing component 202, classical computing component 204, etc.) can implement a kernel trick that can provide a bridge from linearity to non-linearity to any algorithm. In some embodiments, such a kernel trick can be expressed solely in terms of dot products between two vectors. For example, ensemble system 102 (e.g., quantum computing component 202, classical computing component 204, etc.) can implement one or more shift invariant kernels such as, for instance, Gaussian radial basis function (RBF) and/or a Laplacian, as defined by equations (1) and (2) below. In some embodiments, ensemble system 102 (e.g., quantum computing component 202, classical computing component 204, etc.) can map input data into a higher-dimensional space, where a linear algorithm operating in such a higher-dimensional space can behave non-linearly in the original input space.

$$k^{rbf} = \exp(-\|x-z\|^2 / 2\sigma^2) \quad (1)$$

$$k^{lap} = \exp(-\|x-z\| / \sigma) \quad (2)$$

where:
$k^{rbf}$ and $k^{lap}$ can be Radial Basis Function and Laplacian kernels, respectively;
$\|x-z\|$ denotes the Euclidean distance between two feature vectors; and
$\sigma$ denotes a tunable free parameter.

Figure 6A:
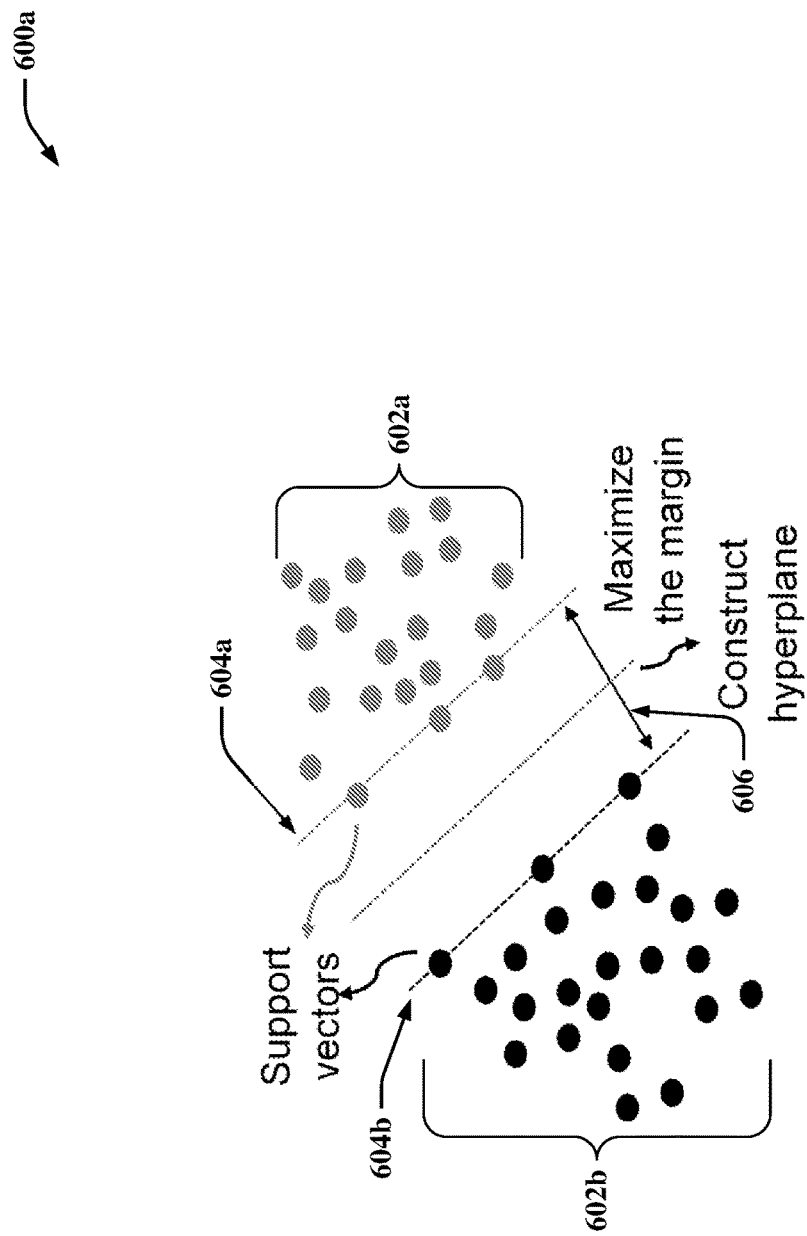
FIG. 6A illustrates an example, non-limiting system that can facilitate a classical and quantum ensemble artificial intelligence (AI) model in accordance with one or more embodiments described herein.
Figure 6B:
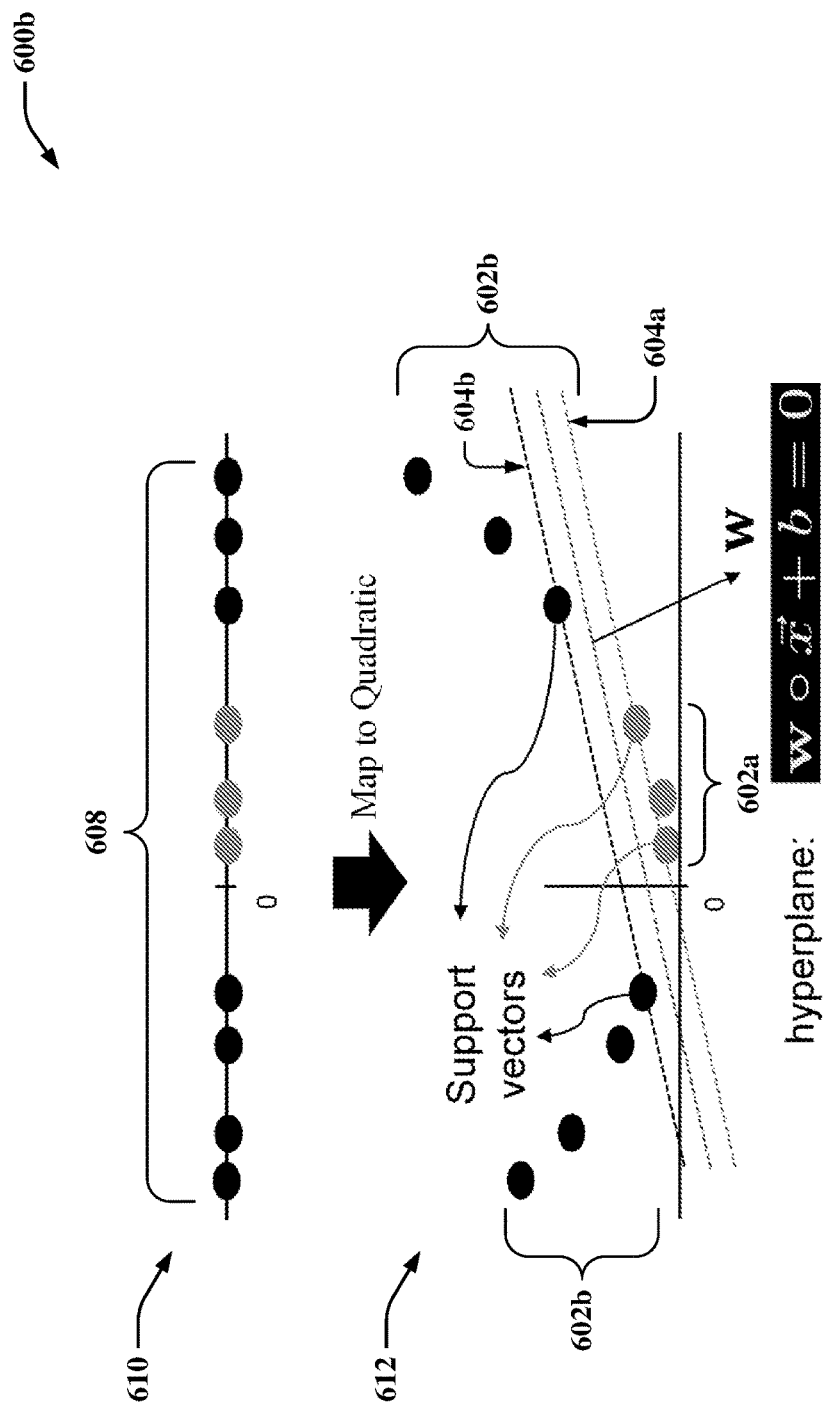
FIG. 6B illustrates an example, non-limiting system that can facilitate a classical and quantum ensemble artificial intelligence (AI) model in accordance with one or more embodiments described herein.

In some embodiments, ensemble system 102 (e.g., quantum computing component 202, classical computing component 204, etc.) can implement one or more kernel machines such as, for example, support vector machines (SVM) comprising support vectors (e.g., as illustrated in FIG. 6A), where such support vector machines can approximate any function based on a large quantity of training data. In some embodiments, ensemble system 102 (e.g., quantum computing component 202, classical computing component 204, etc.) can overcome computational complexity of kernel methods applied to a large-scale problem, where data of a large-scale problem cannot be separated by a linear function. For example, ensemble system 102 (e.g., quantum computing component 202, classical computing component 204, etc.) can overcome computational complexity of kernel methods applied to a large-scale problem by formulating such a problem as a quadratic programming problem (e.g., mapping a function such as, for instance, a linear function to quadratic as illustrated in FIG. 6B). In these embodiments, such a quadratic programming problem can comprise a time complexity of $O(m^3)$ and a space complexity of $O(m^2)$, where m can denote the number of training samples.

In some embodiments, ensemble system 102 (e.g., quantum computing component 202, classical computing component 204, etc.) can implement a support vector machine as a constrained optimization problem, for example, to maximize the margin illustrated in FIG. 6A. For example, ensemble system 102 (e.g., quantum computing component 202, classical computing component 204, etc.) can implement a support vector machine as a constrained optimization problem that can yield a dual quadratic program that only uses access to the kernel $K(\vec{x}_i, \vec{x}_j)$ for $\vec{x}_i$ in training set T, where such a constrained optimization problem can be defined by equation (3) below:

$$L_D(\alpha) = \sum_{i \in T} \alpha_i - \frac{1}{2} \sum_{i,j \in T} k_i k_j \alpha_i \alpha_j K(\vec{x}_i, \vec{x}_j) \quad (3)$$

where:
$\alpha_i$ denotes the weight corresponding to a support vector (e.g., where most of the weights are zero); and
$k_i$ denotes the corresponding label of a training sample i.

In some embodiments, $\alpha^*_i > 0$ can correspond to support vectors and the decision function can be defined by equation (4) below:

$$\tilde{m}(\vec{s}) = \text{sign}(\Sigma_{i \in N_S} \alpha_i k_i K(\vec{x}_i, \vec{s}) + b) \quad (4)$$

where:
N denotes the number of support vectors;
$\alpha_i$ denotes the support vector weight;
$k_i$ denotes the label corresponding to the support vector;
K denotes the kernel between unknown and support vector; and
b denotes the bias term.

In some embodiments, ensemble system 102 (e.g., quantum computing component 202, classical computing component 204, etc.) can implement quantum enhanced feature spaces, where quantum support vector machines can offer advantages over conventional (e.g., classical) support vector machines if the quantum feature map leads to a kernel that cannot be efficiently calculated classically (e.g., via a classical computer). For example, ensemble system 102 (e.g., quantum computing component 202, classical computing component 204, etc.) can implement one or more quantum support vector machines based on equations (5) and (6) below and/or quantum feature map 600c depicted in FIG. 6C.

$$\vec{x} \mapsto |\Phi(\vec{x})\rangle = \mathcal{U}_{\Phi(\vec{x})} |0\rangle^n \quad (5)$$

where $|\Phi(\vec{x})\rangle = \mathcal{U}_{\Phi(\vec{x})} |0\rangle^n$ denotes the feature map on n qubits.

$$K(\vec{x}, \vec{y}) = |\langle \Phi(\vec{x}) | \Phi(\vec{y}) \rangle|^2 \quad (6)$$

where K(x,y) denotes the quantum Kernel.

According to multiple embodiments, classical computing component 204 can comprise any type of classical computing component, machine, device, facility, apparatus, and/or instrument that comprises a processor and/or can be capable of effective and/or operative communication with a wired and/or wireless network. All such embodiments are envisioned. For example, classical computing component 204 can comprise a server device, a classical computer, a classical general-purpose computer, a classical special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of classical computing component, machine, device, facility, apparatus, and/or instrument.

In some embodiments, classical computing component 204 can compute a classical kernel and/or one or more classical support vectors. For example, classical computing component 204 can compute a classical kernel by employing a radial basis function (RBF) kernel. In some embodiments, classical computing component 204 can compute one or more classical support vectors based on the classical kernel or a quantum kernel (e.g., a quantum kernel and/or quantum kernel matrix that can be computed by quantum computing component 202 as described above).

According to multiple embodiments, trainer component 206 can train a classical AI model based on training data and/or train a quantum AI model based on a subset of the training data. For example, trainer component 206 can train a classical AI model based on all data of a training dataset, where such a classical AI model can be implemented by, for instance, classical computing component 204. In this example, trainer component 206 can further train a quantum AI model based on a subset of such a training dataset, where such a quantum AI model can be implemented by, for instance, quantum computing component 202.

In some embodiments, trainer component 206 can train a classical AI model based on training data and/or a quantum AI model based on a subset of such training data by employing one or more learning algorithms including, but not limited to, a supervised learning algorithm, a semi-supervised learning algorithm, an unsupervised learning algorithm, a reinforcement learning algorithm, and/or another learning algorithm. In some embodiments, trainer component 206 can train a classical AI model based on training data and/or a quantum AI model based on a subset of such training data by employing script 700c illustrated in FIG. 7C.

In some embodiments, ensemble system 102 (e.g., via classical computing component 204) can implement one or more classical AI models to identify one or more complex training datasets (e.g., subsets of the original training data) and/or one or more complex classification tasks that cannot be efficiently and/or effectively processed (e.g., from a computational standpoint) by a classical computing device (e.g., by classical computing component 204) using such classical AI model(s). In these embodiments, ensemble system 102 can employ a quantum computing device (e.g., quantum computing component 202) to implement one or more quantum AI models that can classify such complex training dataset(s) and/or execute such complex classification tasks. In these embodiments, trainer component 206 can train such quantum AI models based on such complex training dataset(s) that can comprise subset(s) of the original training data.

According to multiple embodiments, boost component 208 can generate a boosted classical AI model comprising two or more classical artificial intelligence models and/or a boosted quantum AI model comprising two or more quantum artificial intelligence models. In some embodiments, to generate such a boosted classical AI model and/or a boosted quantum AI model, boost component 208 can employ a boosting algorithm (e.g., an adaptive boosting algorithm) to combine one or more classical AI models and/or to combine one or more quantum AI models. For example, to generate such a boosted classical AI model and/or a boosted quantum AI model, boost component 208 can employ algorithm 300 described below and illustrated in FIG. 3 to combine one or more classical AI models and/or to combine one or more quantum AI models (e.g., as described below and illustrated in FIGS. 4 and 5).

FIG. 3 illustrates an example, non-limiting algorithm 300 that can facilitate a classical and quantum ensemble artificial intelligence (AI) model in accordance with one or more embodiments described herein. Repetitive description of like elements and/or processes employed in respective embodiments is omitted for sake of brevity.

According to multiple embodiments, algorithm 300 can comprise a boosting algorithm (e.g., an adaptive boosting algorithm). In some embodiments, ensemble system 102 and/or components thereof (e.g., ensemble component 108, score component 110, boost component 208, etc.) can facilitate performance of various operations described herein by executing one or more sections of algorithm 300. For example, as described above with reference to FIGS. 1 and 2, ensemble system 102 and/or components thereof (e.g., ensemble component 108, score component 110, boost component 208, etc.) can employ algorithm 300 to boost one or more AI models (e.g., classical and/or quantum AI models) and/or to generate an ensemble AI model comprising one or more classical AI models and/or one or more quantum AI models. In some embodiments, algorithm 300 can comprise an adaptive boosting algorithm that can change sample distribution by modifying one or more weights corresponding to training data. For example, as described below with reference to FIG. 5, algorithm 300 can comprise an adaptive boosting algorithm that, when implemented (e.g., by ensemble component 108, score component 110, etc.), can change sample distribution by modifying one or more weights corresponding to training data.

Figure 4:
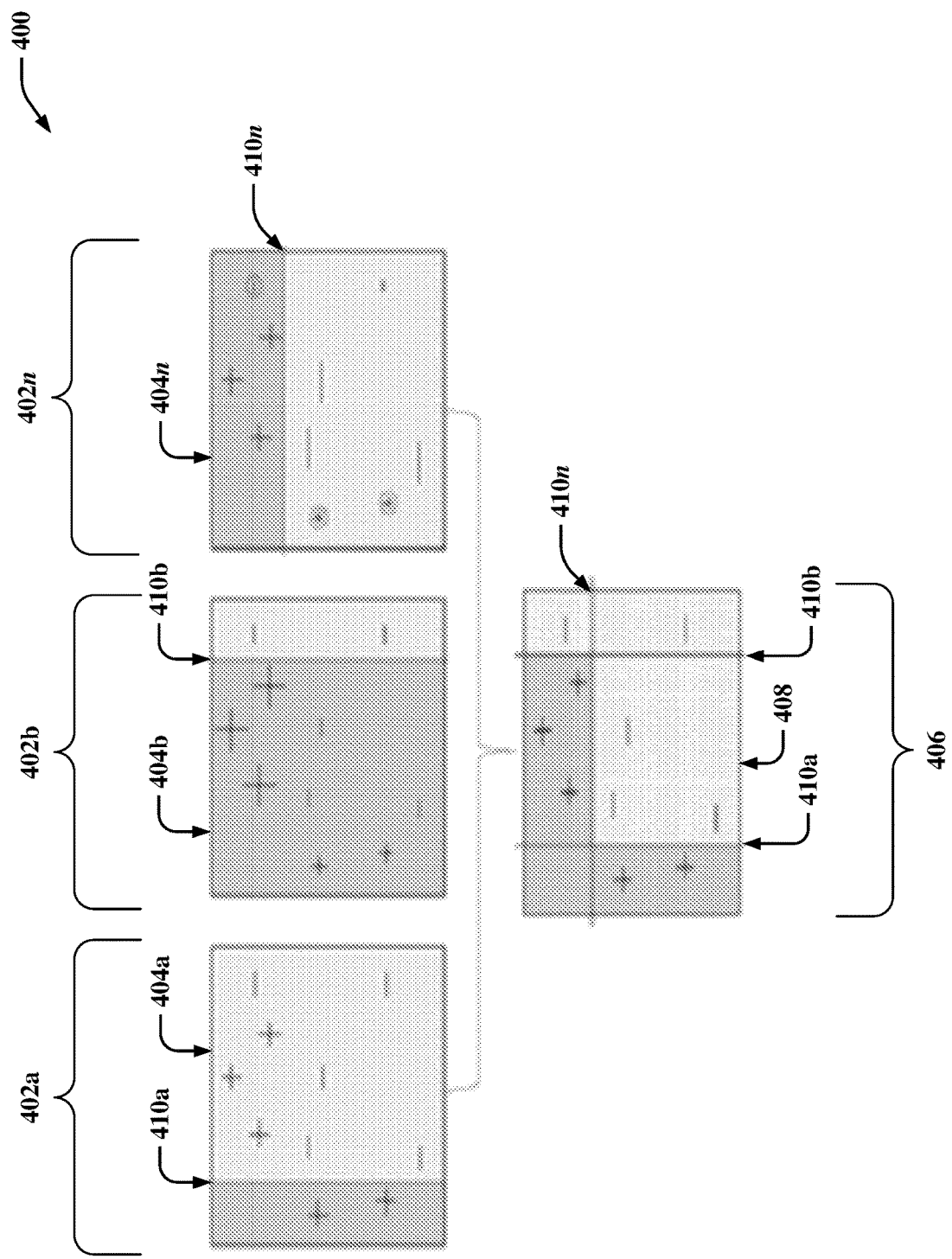
FIG. 4 illustrates an example, non-limiting system that can facilitate a classical and quantum ensemble artificial intelligence (AI) model in accordance with one or more embodiments described herein.

FIG. 4 illustrates an example, non-limiting system 400 that can facilitate a classical and quantum ensemble artificial intelligence (AI) model in accordance with one or more embodiments described herein. Repetitive description of like elements and/or processes employed in respective embodiments is omitted for sake of brevity.

In some embodiments, system 400 can comprise one or more AI models 402a, 402b, 402n (where n can represent a total quantity of AI models), one or more AI model results 404a, 404b, 404n (where n can represent a total quantity of AI models), a boosted AI model 406, and/or a boosted AI model results 408. In some embodiments, AI models 402a, 402b, 402n can comprise one or more classical AI models and/or one or more quantum AI models. In some embodiments, AI model results 404a, 404b, 404n can comprise classifier results of AI models 402a, 402b, 402n that can be implemented to classify (e.g., label, categorize, etc.) one or more entities of a dataset, where such entities are represented by plus symbols (+) and minus symbols (−) in FIG. 4. In some embodiments, as illustrated in FIG. 4, AI model results 404a, 404b, 404n can comprise one or more decision boundaries 410a, 410b, 410n (where n can represent a total quantity of decision boundaries). In some embodiments, boosted AI model 406 and/or boosted AI model results 408 can comprise a weighted combination of one or more AI models 402a, 402b, 402n and/or one or more AI model results 404a, 404b, 404n.

In some embodiments, as described above with reference to FIG. 1, to generate an ensemble AI model comprising one or more classical AI models and/or one or more quantum AI models, ensemble component 108 can implement a boosting technique (e.g., a boosting algorithm such as, for instance, algorithm 300 illustrated in FIG. 3) to combine two or more AI models and/or to iteratively add one or more AI models to an existing ensemble AI model. In these embodiments, such combination and/or iterative addition can be represented by AI models 402a, 402b, 402n, AI model results 404a, 404b, 404n, boosted AI model 406, and/or boosted AI model results 408 illustrated in FIG. 4. For example, at each stage, ensemble component 108 can introduce (e.g., add) an AI model (e.g., a weak performing learner or classifier) to compensate the "shortcomings" of one or more AI models of an ensemble AI model (e.g., one or more weak performing learners or classifiers of a previously generated ensemble AI model) by high-weight data points.

In some embodiments, at instant t, ensemble component 108 can weigh outcomes of an ensemble AI model (e.g., outcomes of each individual AI model of such an ensemble AI model) based on the outcomes of a previous instance, at t−1, for example. In some embodiments, for example, as illustrated by system 500 described below and depicted in FIG. 5, ensemble component 108 can assign a lower weight value to correctly classified outcomes and/or a higher weight value to miss-classified outcomes.

In some embodiments, as described above with reference to FIG. 2, to generate a boosted classical AI model comprising two or more classical AI models and/or a boosted quantum AI model comprising two or more quantum AI models, boost component 208 can implement a boosting technique (e.g., a boosting algorithm such as, for instance, algorithm 300 illustrated in FIG. 3) to combine two or more AI models and/or to iteratively add one or more AI models to an existing boosted AI model. In these embodiments, such combination and/or iterative addition can be represented by AI models 402a, 402b, 402n, AI model results 404a, 404b, 404n, boosted AI model 406, and/or boosted AI model results 408 illustrated in FIG. 4. For example, at each stage, boost component 208 can introduce (e.g., add) an AI model (e.g., a weak performing learner or classifier) to compensate the "shortcomings" of one or more AI models of a boosted AI model (e.g., one or more weak performing learners or classifiers of a previously generated boosted AI model) by high-weight data points.

In some embodiments, at instant t, boost component 208 can weigh outcomes of a boosted AI model (e.g., outcomes of each individual AI model of such a boosted AI model) based on the outcomes of a previous instance, at t−1, for example. In some embodiments, for example, as illustrated by system 500 described below and depicted in FIG. 5, boost component 208 can assign a lower weight value to correctly classified outcomes and/or a higher weight value to miss-classified outcomes.

Figure 5:
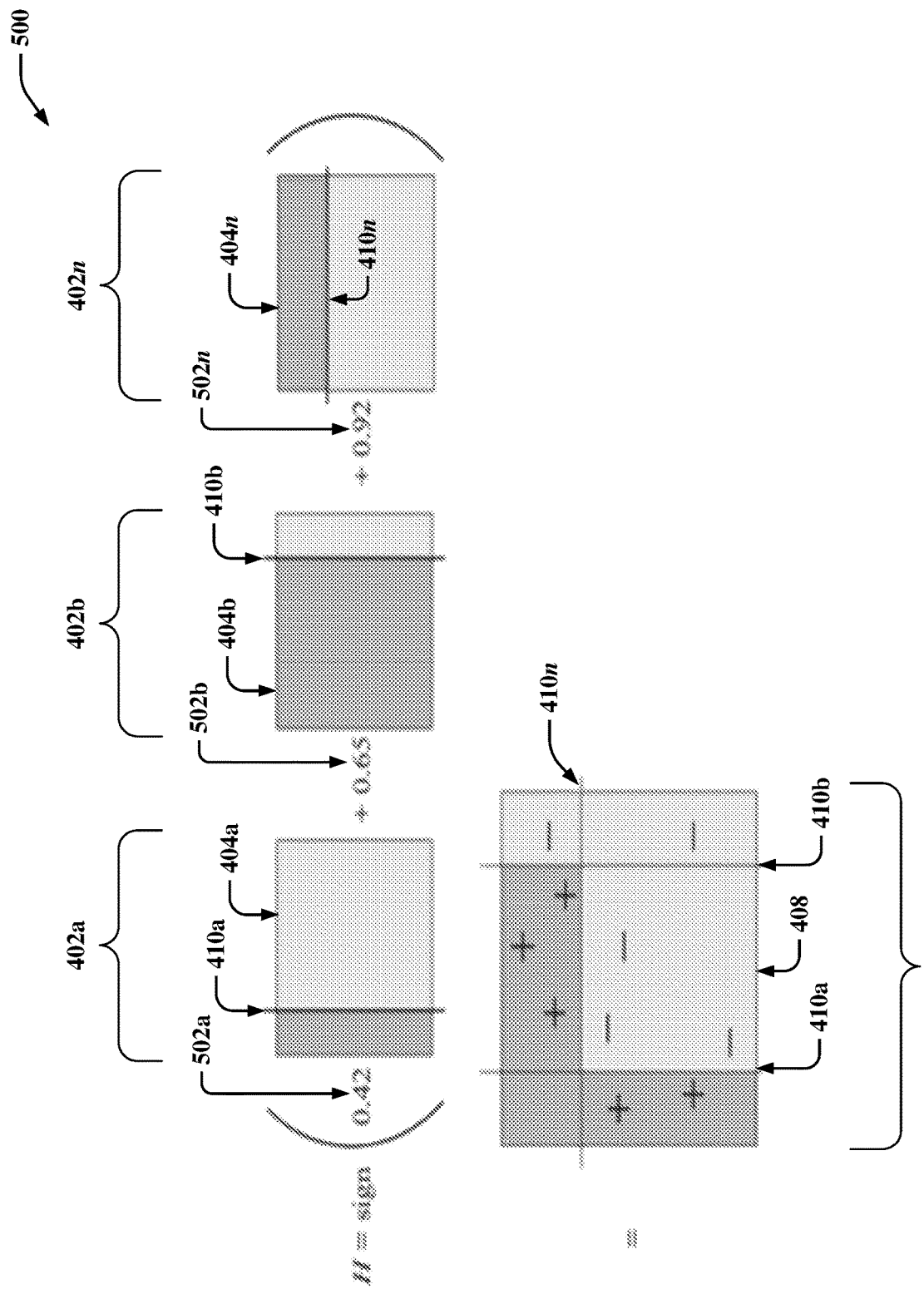
FIG. 5 illustrates an example, non-limiting system that can facilitate a classical and quantum ensemble artificial intelligence (AI) model in accordance with one or more embodiments described herein.

FIG. 5 illustrates an example, non-limiting system 500 that can facilitate a classical and quantum ensemble artificial intelligence (AI) model in accordance with one or more embodiments described herein. Repetitive description of like elements and/or processes employed in respective embodiments is omitted for sake of brevity.

In some embodiments, as described above with reference to FIG. 1, ensemble component 108 can employ algorithm 300 illustrated in FIG. 3 to boost one or more AI models and/or to generate an ensemble AI model comprising one or more classical AI models and/or one or more quantum AI models. In some embodiments, algorithm 300 can comprise an adaptive boosting algorithm that can change sample distribution by modifying one or more weights corresponding to training data. For example, algorithm 300 can comprise an adaptive boosting algorithm that, when implemented (e.g., by ensemble component 108, score component 110, etc.), can change sample distribution by modifying one or more weights 502a, 502b, 502n (where n can represent a total quantity of weights) corresponding to training data represented by plus symbols (+) and minus symbols (−) in FIGS. 4 and 5. In some embodiments, ensemble component 108 can employ algorithm 300 to increase the weight of mis-classified data and decrease the weight of correctly classified data (e.g., as illustrated in FIGS. 4 and 5). In some embodiments, based on training one or more AI models (e.g., via trainer component 206) ensemble component 108 can add the weight of a weak performing AI model (e.g., a weak learner or classifier) to an ensemble AI model based on the performance of such a weak performing AI model. In some embodiments, the better a weak performing AI model performs, the more it contributes to the ensemble AI model.

In some embodiments, ensemble component 108 can facilitate such increase and/or decrease in weights corresponding to training data as described above based on an output of algorithm 300, which can comprise equation (7) below:

$$H^{(x)} = \text{sign}(\Sigma_{t=1}^{T} \alpha_t h_t(x)) \quad (7)$$

where:
T denotes the number of component classifiers;
$\alpha_t$ denotes the weight of the component classifier; and
$h_t$ denotes the component classifier model (e.g., SVM classifiers, using classical RBF and Quantum kernels).

In some embodiments, in training a boosted AI model and/or an ensemble AI model, a weak performing AI model (e.g., learner, classifier, etc.) may use the weights or data can be subsampled according to the distribution of weights. In some embodiments, the weight of a component classifier can be ≥0 if error ≤½, the smaller the error the higher the weight.

FIG. 6A illustrates an example, non-limiting system 600a that can facilitate a classical and quantum ensemble artificial intelligence (AI) model in accordance with one or more embodiments described herein. Repetitive description of like elements and/or processes employed in respective embodiments is omitted for sake of brevity.

In some embodiments, FIG. 6A can comprise a visual representation of how an AI model can classify a dataset into two or more data classes. For example, in some embodiments, system 600a can comprise an AI model such as, for instance, a support vector machine (SVM) that, when implemented by ensemble system 102 (e.g., via quantum computing component 202, classical computing component 204, etc.), can classify a dataset into two or more data classes 602a, 602b, where data class 602a is depicted in FIG. 6A as gray dots and data class 602b is depicted as black dots. In some embodiments, for example, in embodiments where system 600a comprises a SVM, system 600a can determine (e.g., compute, identify, etc.) support vectors 604a, 604b that can maximize a margin 606 that can separate data class 602a and data class 602b, where margin 606 can comprise a distance between data class 602a and data class 602b.

FIG. 6B illustrates an example, non-limiting system 600b that can facilitate a classical and quantum ensemble artificial intelligence (AI) model in accordance with one or more embodiments described herein. Repetitive description of like elements and/or processes employed in respective embodiments is omitted for sake of brevity.

In some embodiments, FIG. 6B can comprise a visual representation of how a dataset 608 in a low-dimensional space 610 (e.g., a one-dimensional space, a linear space, etc.) can be mapped to a high-dimensional space 612 (e.g., a multi-dimensional space, a quadratic space, etc.) and/or how an AI model can classify dataset 608 into two or more data classes 602a, 602b in such a high-dimensional space 612. For example, in some embodiments, system 600b can comprise an AI model such as, for instance, a support vector machine (SVM). In this example, FIG. 6B can comprise a visual representation of how ensemble system 102 (e.g., via quantum computing component 202, classical computing component 204, etc.) can implement a kernel trick (e.g., as described above with reference to FIG. 2) to formulate such an SVM as a quadratic programming problem (e.g., a quantum SVM) by mapping dataset 608 from low-dimensional space 610 to high-dimensional space 612 and classifying dataset 608 into data classes 602a, 602b in high-dimensional space 612. In some embodiments, to facilitate such a kernel trick formulation of an SVM as a quadratic programming problem (e.g., a quantum SVM) and/or to facilitate such classification of dataset 608 into data classes 602a, 602b, ensemble system 102 (e.g., via quantum computing component 202, classical computing component 204, etc.) can construct a hyperplane w defined by equation (8) below:

$$w \circ \vec{x} + b = O \quad (8)$$

where:
w denotes a vector;
x denotes a set of data points; and
b denotes a bias. As referenced herein, a hyperplane (e.g., any hyperplane) can be written as the set of points x satisfying w·x+b=0.

Figure 6C:
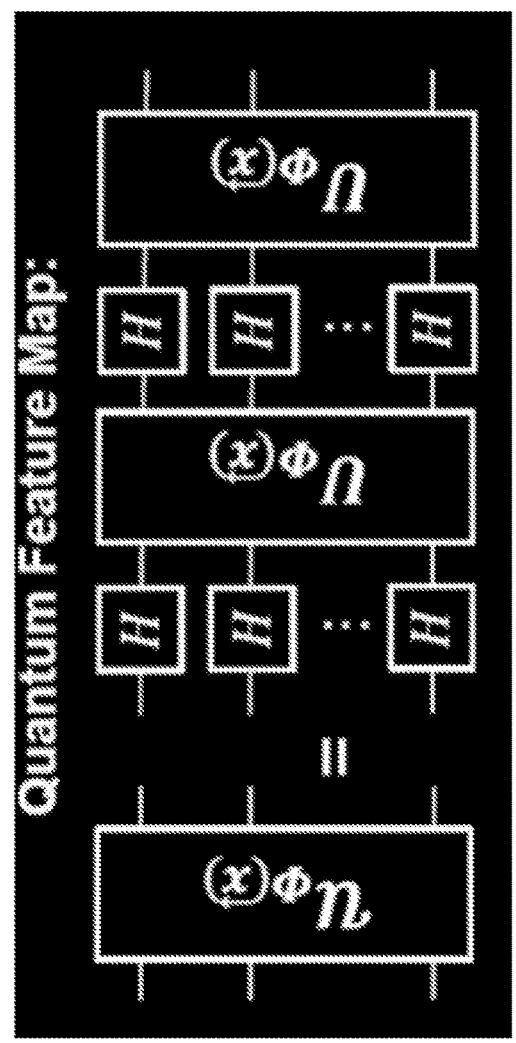
FIG. 6C illustrates an example, non-limiting quantum feature map that can facilitate a classical and quantum ensemble artificial intelligence (AI) model in accordance with one or more embodiments described herein.

FIG. 6C illustrates an example, non-limiting quantum feature map 600c that can facilitate a classical and quantum ensemble artificial intelligence (AI) model in accordance with one or more embodiments described herein. Repetitive description of like elements and/or processes employed in respective embodiments is omitted for sake of brevity.

In some embodiments, quantum feature map 600c can comprise a two-layer map that can comprise Hadamard and entanglement gates, where quantum feature map 600c cannot be implemented classically (e.g., via a classical computer). In some embodiments, data of quantum feature map 600c can be between zero and 2PI. In some embodiments, quantum feature map 600c can encode both the actual function of the diagonal phases as well as the corresponding Fourier-Walsh transform. In some embodiments, ensemble system 102 (e.g., via quantum computing component 202, classical computing component 204, etc.) can employ quantum feature map 600c and/or equations (3), (4), (5), and (6) defined above with reference to FIG. 2, to facilitate such a kernel trick formulation of an SVM as a quadratic programming problem (e.g., a quantum SVM) and/or to facilitate such classification of dataset 608 into data classes 602a, 602b as described above and illustrated in FIG. 6B.

FIGS. 7A, 7B, 7C, and 7D illustrate example, non-limiting scripts 700a, 700b, 700c, 700d that can facilitate a classical and quantum ensemble artificial intelligence (AI) model in accordance with one or more embodiments described herein. Repetitive description of like elements and/or processes employed in respective embodiments is omitted for sake of brevity.

In some embodiments, ensemble system 102 (e.g., via quantum computing component 202, classical computing component 204, etc.) can execute script 700a (FIG. 7A) to compute the quantum kernel described above with reference to FIG. 1. For example, quantum computing component 202 can execute script 700a to compute a quantum kernel in qsvm_kernel_bynary.py.

In some embodiments, ensemble system 102 (e.g., via quantum computing component 202, classical computing component 204, etc.) can execute script 700b (FIG. 7B) to implement the kernel trick described above with reference to FIGS. 2, 6B, and 6C, where such a kernel trick can provide a bridge from linearity to non-linearity to any algorithm. For example, ensemble system 102 (e.g., via quantum computing component 202, classical computing component 204, etc.) can execute script 700b to generate a custom kernel that can provide a bridge from linearity to non-linearity to any algorithm. For instance, as described above with reference to FIG. 6B, ensemble system 102 (e.g., via quantum computing component 202, classical computing component 204, etc.) can execute script 700b to generate a custom kernel (e.g., an SVM formulated as a quadratic programming problem) that can facilitate mapping a dataset (e.g., dataset 608) from a low-dimensional space (e.g., low-dimensional space 610) to a high-dimensional space (e.g., high-dimensional space 612) and classifying such a dataset into data classes (e.g., data classes 602a, 602b) in such a high-dimensional space.

In some embodiments, ensemble system 102 (e.g., via ensemble component 108, score component 110, quantum computing component 202, classical computing component 204, trainer component 206, boost component 208, etc.) can execute script 700c (FIG. 7C) to define one or more AI models. For example, ensemble system 102 (e.g., via ensemble component 108, score component 110, quantum computing component 202, classical computing component 204, trainer component 206, boost component 208, etc.) can execute script 700c to define one or more AI models including, but not limited to, one or more classical AI models, one or more quantum AI models, one or more boosted classical AI models, one or more boosted quantum AI models, one or more ensemble AI models (e.g., comprising at least one classical AI model and at least one quantum AI model), and/or another AI model. For instance, ensemble component 108 and/or boost component 208 can execute script 700c to define an ensemble AI model as described above with reference to FIGS. 1, 3, 4, and 5 and/or a boosted AI model (e.g., a boosted classical AI model and/or a boosted quantum AI model) as described above with reference to FIGS. 2, 3, 4, and 5.

In some embodiments, ensemble system 102 (e.g., via ensemble component 108, score component 110, quantum computing component 202, classical computing component 204, trainer component 206, boost component 208, etc.) can execute script 700c (FIG. 7C) to train one or more AI models. For example, ensemble system 102 (e.g., via ensemble component 108, score component 110, quantum computing component 202, classical computing component 204, trainer component 206, boost component 208, etc.) can execute script 700c to train one or more AI models including, but not limited to, one or more classical AI models, one or more quantum AI models, one or more boosted classical AI models, one or more boosted quantum AI models, one or more ensemble AI models (e.g., comprising at least one classical AI model and at least one quantum AI model), and/or another AI model. For instance, trainer component 206 can execute script 700c to train a classical AI model (e.g., of a boosted classical AI model and/or of an ensemble AI model) based on all data of a training dataset and/or to train a quantum AI model (e.g., of a boosted quantum AI model and/or of an ensemble AI model) based on a subset of such training dataset as described above with reference to FIG. 2.

In some embodiments, ensemble system 102 (e.g., via score component 110, quantum computing component 202, classical computing component 204, etc.) can execute script 700c (FIG. 7C) to test one or more AI models. For example, ensemble system 102 (e.g., via score component 110, quantum computing component 202, classical computing component 204, etc.) can execute script 700c to test one or more AI models including, but not limited to, one or more classical AI models, one or more quantum AI models, one or more boosted classical AI models, one or more boosted quantum AI models, one or more ensemble AI models (e.g., comprising at least one classical AI model and at least one quantum AI model), and/or another AI model. For instance, ensemble system 102 (e.g., via score component 110, quantum computing component 202, classical computing component 204, etc.) can execute script 700c to test a boosted AI model (e.g., a boosted classical AI model, a boosted quantum AI model, etc.) generated by boost component 208 as described above with reference to FIGS. 2, 3, 4, and 5 and/or to test an ensemble AI model generated by ensemble component 108 as described above with reference to FIGS. 1, 3, 4, and 5.

In some embodiments, ensemble system 102 (e.g., via ensemble component 108, score component 110, quantum computing component 202, classical computing component 204, boost component 208, etc.) can execute script 700d (FIG. 7D) to generate one or more boosted AI models (e.g., boosted classical AI model, boosted quantum AI model, etc.) and/or one or more ensemble AI models (e.g., comprising at least one classical AI model and at least one quantum AI model). For example, ensemble component 108 can execute script 700d to generate one or more ensemble AI models as described above with reference to FIGS. 1, 3, 4, and 5. In another example, boost component 208 can execute script 700d to generate one or more boosted AI models as described above with reference to FIGS. 2, 3, 4, and 5.

In some embodiments, ensemble system 102 (e.g., via ensemble component 108, score component 110, quantum computing component 202, classical computing component 204, boost component 208, etc.) can execute script 700d (FIG. 7D) to compute probability scores of a dataset based on an ensemble AI model. For example, score component 110 can execute script 700d to compute probability scores of a dataset based on an ensemble AI model that can be generated by ensemble component 108 as described above with reference to FIGS. 1, 3, 4, and 5.

Figure 8A:
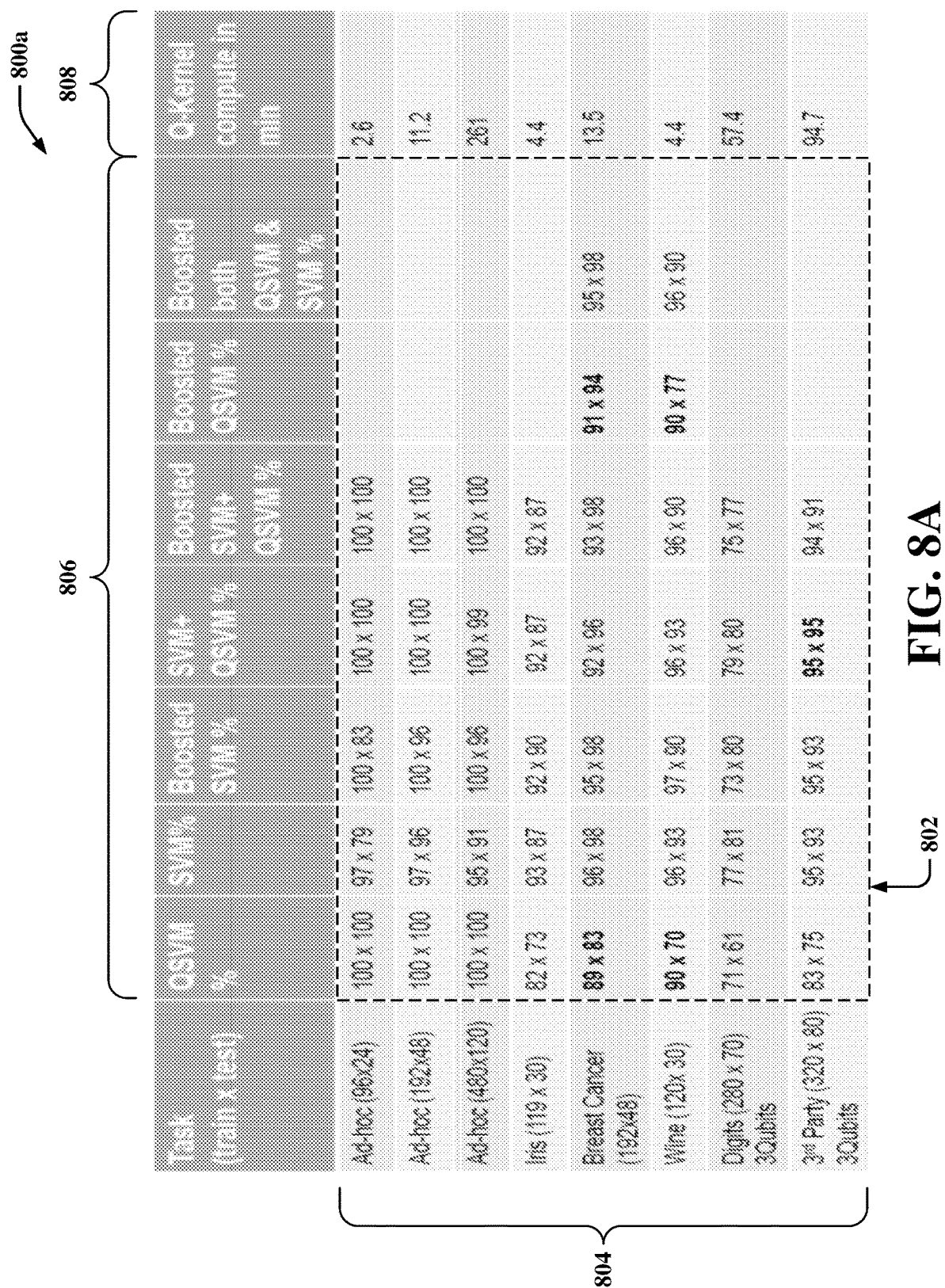
FIG. 8A illustrates an example, non-limiting table that can facilitate a classical and quantum ensemble artificial intelligence (AI) model in accordance with one or more embodiments described herein.

FIG. 8A illustrates an example, non-limiting table 800a that can facilitate a classical and quantum ensemble artificial intelligence (AI) model in accordance with one or more embodiments described herein. Repetitive description of like elements and/or processes employed in respective embodiments is omitted for sake of brevity.

According to multiple embodiments, table 800a can comprise one or more probability scores 802 (e.g., denoted as percentage (%) values in FIG. 8A) corresponding to one or more datasets 804 (e.g., denoted as task (train x test) in FIG. 8A) based on one or more AI models 806 that can be implemented by ensemble system 102. For example, table 800a can comprise one or more probability scores 802 that can be computed by score component 110 as described above with reference to FIG. 1, where such probability scores 802 can correspond to one or more datasets 804 (e.g., Ad-hoc (96×24), Iris (119×30), Digits (280×70) 3Qubits, etc.) based on one or more AI models 806. In some embodiments, table 800a can comprise quantum kernel compute time 808 expressed in minutes (e.g., denoted as Q-Kernel compute in min in FIG. 8A), where quantum kernel compute time 808 can comprise the time it takes an AI model 806 (e.g., an AI model generated based on a quantum kernel) to classify a dataset 804.

In some embodiments, score component 110 can compute probability scores 802 corresponding to datasets 804 based on one or more AI models 806 generated by and/or implemented by ensemble system 102. For example, score component 110 can compute probability scores 802 corresponding to datasets 804 based on one or more AI models 806 generated by and/or implemented by ensemble system 102 (e.g., via ensemble component 108, boost component 208, etc.), where such one or more AI models 806 can include, but are not limited to: a quantum support vector machine (QSVM); a classical support vector machine (SVM); a boosted classical support vector machine (Boosted SVM); an ensemble AI model (SVM+QSVM) comprising a classical support vector machine and a quantum support vector machine; an ensemble AI model (Boosted SVM+QSVM) comprising a boosted classical support vector machine and a quantum support vector machine; a boosted quantum support vector machine (Boosted QSVM); an ensemble AI model (Boosted QSVM+Boosted SVM) comprising a boosted quantum support vector machine and a boosted classical support vector machine. In this example, ensemble system 102 and/or score component 110 can generate table 800a based on computation of probability scores 802 by score component 110.

Figure 8B:
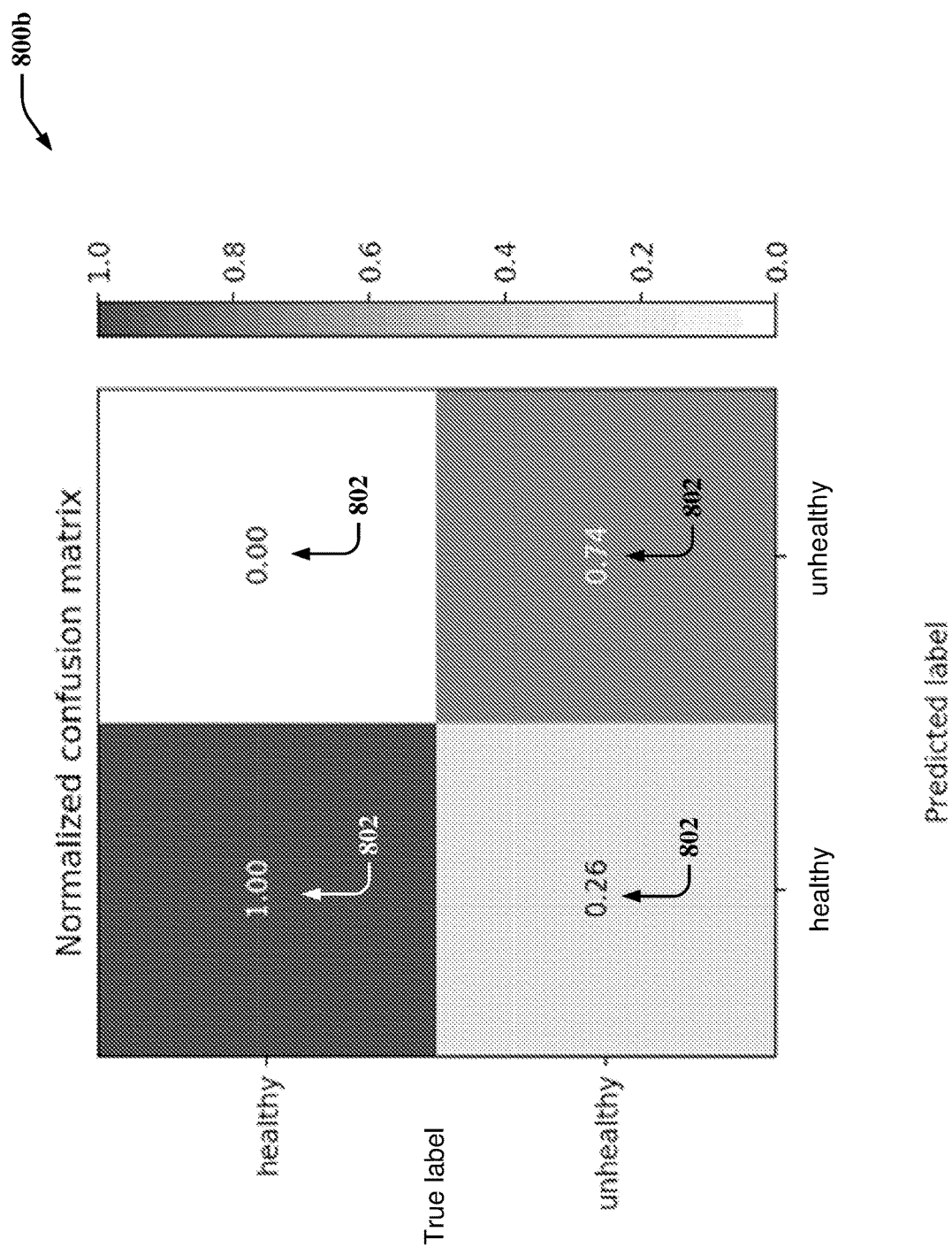
FIGS. 8B and 8C illustrate example, non-limiting matrices that can facilitate a classical and quantum ensemble artificial intelligence (AI) model in accordance with one or more embodiments described herein.
Figure 8C:
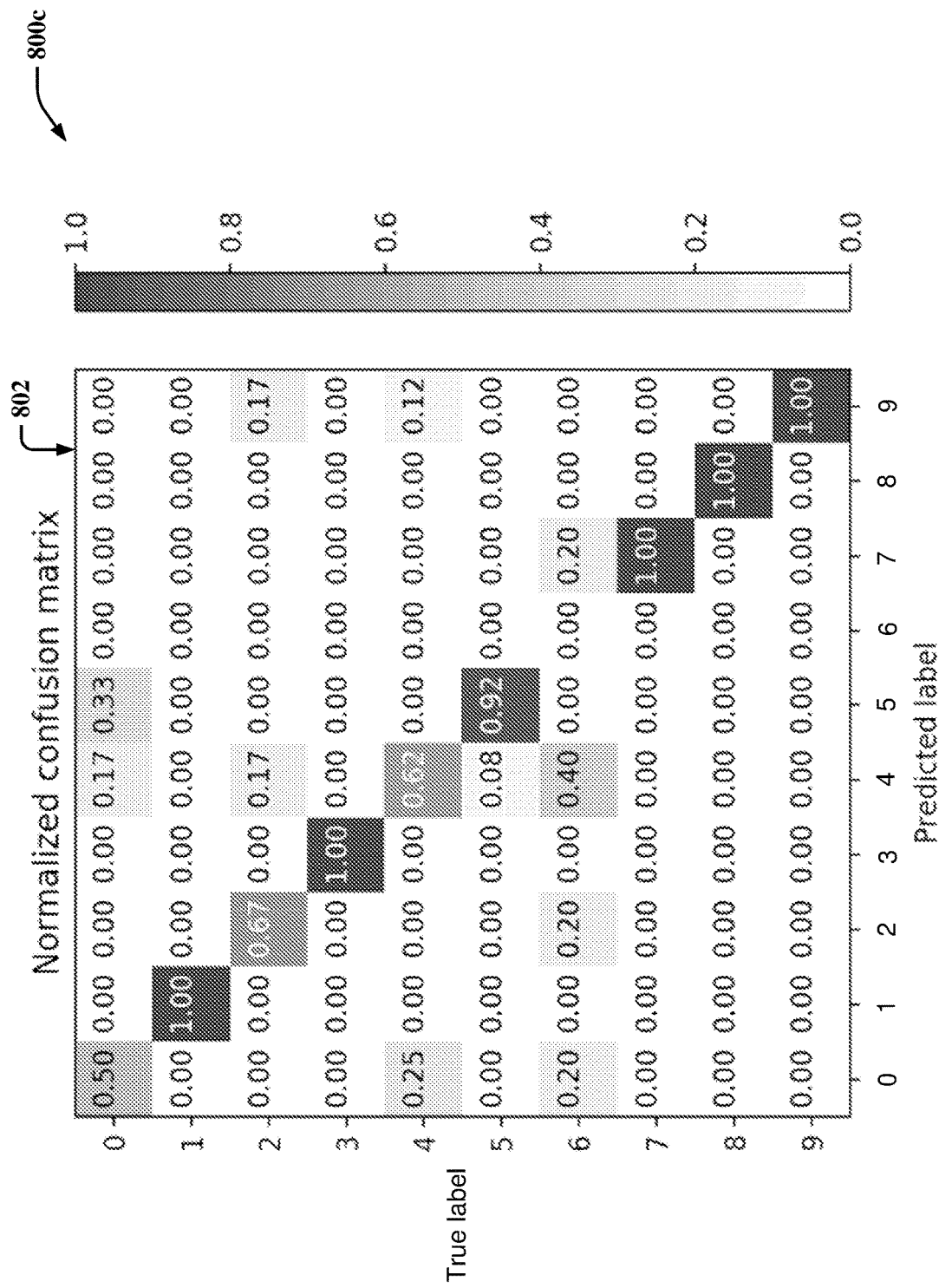

FIGS. 8B and 8C illustrate example, non-limiting matrices 800b, 800c that can facilitate a classical and quantum ensemble artificial intelligence (AI) model in accordance with one or more embodiments described herein. Repetitive description of like elements and/or processes employed in respective embodiments is omitted for sake of brevity.

According to multiple embodiments, matrix 800b (FIG. 8B) can comprise a normalized confusion matrix. In some embodiments, score component 110 can compute probability scores 802 (e.g., denoted as decimal numbers in FIG. 8B) corresponding to a dataset 804 (e.g., the $3^{rd}$ Party (320×80) 3Qubits dataset illustrated in FIG. 8A) based on one or more AI models 806 generated by and/or implemented by ensemble system 102 (e.g., the AI models defined above with reference to FIG. 8A).

According to multiple embodiments, matrix 800c (FIG. 8C) can comprise a normalized confusion matrix. In some embodiments, score component 110 can compute probability scores 802 (e.g., denoted as decimal numbers in FIG. 8B) corresponding to a dataset 804 (e.g., the Digits (280×70) 3Qubits dataset illustrated in FIG. 8A) based on one or more AI models 806 generated by and/or implemented by ensemble system 102 (e.g., the AI models defined above with reference to FIG. 8A). For example, score component 110 can compute probability scores 802 of matrix 800c that correspond to a dataset 804 comprising numerical digits zero (0), one (1), two (2), three (3), four (4), five (5), six (6), seven (7), eight (8), and nine (9) as illustrated in FIG. 8C, where score component 110 can compute such probability scores 802 based on one or more AI models 806 generated by and/or implemented by ensemble system 102 (e.g., the AI models defined above with reference to FIG. 8A).

In some embodiments, as described above with reference to FIG. 2, ensemble system 102 (e.g., via classical computing component 204) can implement one or more classical AI models to identify one or more complex training datasets (e.g., subsets of the original training data) and/or one or more complex classification tasks that cannot be efficiently and/or effectively processed (e.g., from a computational standpoint) by a classical computing device (e.g., by classical computing component 204) using such classical AI model(s). For example, based on score component 110 computing a probability score of 0.00 corresponding to classification of digit number six (6) as depicted in FIG. 8C, ensemble system 102 can identify the dataset of matrix 800c and/or data corresponding to digit number six (6) as complex training data and/or as a complex classification task. In this example, based on such identification, ensemble system 102 can employ a quantum computing device (e.g., quantum computing component 202) to generate and/or implement one or more quantum AI models that can effectively classify the digit number six (6) based only on training data corresponding the digit number six (6), which can comprise a subset of the original training data of the dataset of matrix 800c.

Figure 8D:
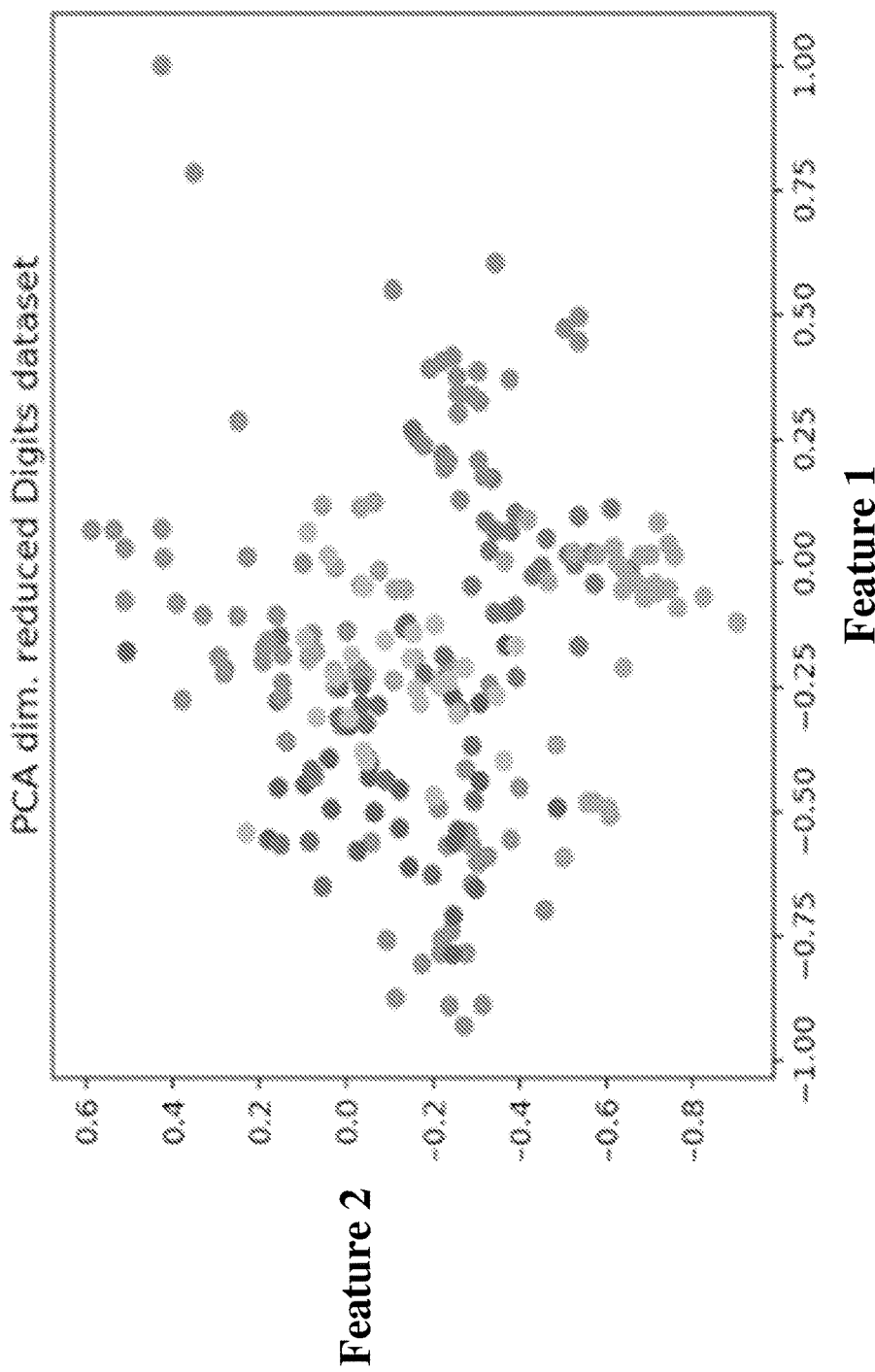
FIG. 8D illustrates an example, non-limiting plot that can facilitate a classical and quantum ensemble artificial intelligence (AI) model in accordance with one or more embodiments described herein.

FIG. 8D illustrates an example, non-limiting plot 800d that can facilitate a classical and quantum ensemble artificial intelligence (AI) model in accordance with one or more embodiments described herein. Repetitive description of like elements and/or processes employed in respective embodiments is omitted for sake of brevity.

According to multiple embodiments, plot 800d can comprise a visual representation of data entities of a principle component analysis (e.g., denoted as PCA in FIG. 8D), where the X-axis of plot 800d can comprise Feature 1 and the Y-axis can comprise Feature 2. For example, plot 800d can comprise a PCA reduced features of Digits dataset to 2 dimensions, where plot 800d can depict distributed data entities of such reduced Digits dataset. For instance, plot 800d can comprise a visual representation of data entities of a reduced Digits dataset such as, for instance, the training data corresponding to the digit number six (6) of matrix 800c that can be identified by ensemble system 102 as complex training data and/or as a complex classification task as described above with reference to FIG. 8C. In this example, ensemble system 102 can generate plot 800d comprising only such training data corresponding to the digit number six (6) of matrix 800c and can further generate and/or implement a quantum AI model (e.g., a single quantum AI model, a boosted quantum AI model, etc.) to effectively classify the digit number six (6) of the dataset of matrix 800c.

In some embodiments, ensemble system 102 can be associated with various technologies. For example, ensemble system 102 can be associated with classical computing technologies, quantum computing technologies, classical AI model technologies, quantum AI model technologies, classical AI model boosting technologies, quantum AI model boosting technologies, ensemble AI model technologies, optimization technologies, quantum computer programming technologies, and/or other technologies.

In some embodiments, ensemble system 102 can provide technical improvements to systems, devices, components, operational steps, and/or processing steps associated with the various technologies identified above. For example, ensemble system 102 can facilitate improved data representations by combining classical AI models and/or quantum AI models. In another example, ensemble system 102 can generate and/or execute one or more boosted AI models and/or one or more ensemble AI models to discover effective data representation of classical and/or quantum AI learning models. In another example, ensemble system 102 can generate and/or execute a classical AI model to identify one or more complex training datasets and/or complex classification tasks that cannot be executed efficiently and/or effectively by such a classical AI model (e.g., due to computational cost). In this example, based on such identification, ensemble system 102 can generate and/or execute a quantum AI model to classify such complex training dataset(s) and/or perform such complex classification task(s). In another example, ensemble system 102 can apply a fast-match approach using only one or more classical AI models or only one or more quantum AI models to reduce search space (e.g., to reduce 100 classes to 10 classes, thereby reducing the amount of data (e.g., features) that must be input to a quantum computer). In this example, based on such reduction of search space, ensemble system 102 can apply a detailed-match approach by generating and/or implementing an ensemble AI model comprising one or more classical AI models and/or one or more quantum AI models to make a final decision using high-dimensional computation techniques of a quantum computing device. In another example, ensemble system 102 can scale to large training datasets by generating and/or implementing one or more classical AI models to process most of the data and generating and/or implementing one or more quantum AI models selectively based on some outcomes or subsampling.

In some embodiments, ensemble system 102 can provide technical improvements to a processing unit (e.g., processor 106) associated with a classical computing device (e.g., classical computing component 204) and/or a quantum computing device (e.g., quantum computing component 202, a quantum computer, a quantum processor, quantum hardware, etc.). For example, by implementing one or more classical AI models based on all data of a training dataset, implementing one or more quantum AI models based on a subset of the training dataset, and implementing an ensemble AI model comprising one or more classical AI models and one or more quantum AI models (e.g., where such an ensemble AI model can be generated based on a quantum kernel matrix), ensemble system 102 can reduce processing time and/or processing workload of such a processing unit (e.g., processor 106), thereby facilitating improved processing performance of such a processing unit. In this example, based on implementing such an ensemble AI model, ensemble system 102 can further facilitate improved probability scores of the training dataset.

In some embodiments, ensemble system 102 can employ hardware or software to solve problems that are highly technical in nature, that are not abstract and that cannot be performed as a set of mental acts by a human. In some embodiments, some of the processes described herein can be performed by one or more specialized computers (e.g., specialized classical computer(s), specialized classical processing unit(s), specialized quantum computer(s), specialized quantum processing unit(s), etc.) for carrying out defined tasks related to the various technologies identified above. In some embodiments, ensemble system 102 or components thereof, can be employed to solve new problems that arise through advancements in technologies mentioned above, employment of quantum computing systems, cloud computing systems, computer architecture, and/or another technology.

It is to be appreciated that ensemble system 102 can utilize various combinations of electrical components, mechanical components, and circuitry that cannot be replicated in the mind of a human or performed by a human, as the various operations that can be executed by ensemble system 102 or components thereof as described herein are operations that are greater than the capability of a human mind. For instance, the amount of data processed, the speed of processing such data, or the types of data processed by ensemble system 102 over a certain period of time can be greater, faster, or different than the amount, speed, or data type that can be processed by a human mind over the same period of time.

According to several embodiments, ensemble system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that ensemble system 102 can include information that is impossible to obtain manually by an entity, such as a human user. For example, the type, amount, or variety of information included in ensemble system 102, ensemble component 108, score component 110, quantum computing component 202, classical computing component 204, trainer component 206, and/or boost component 208 can be more complex than information obtained manually by a human user.

Figure 9A:
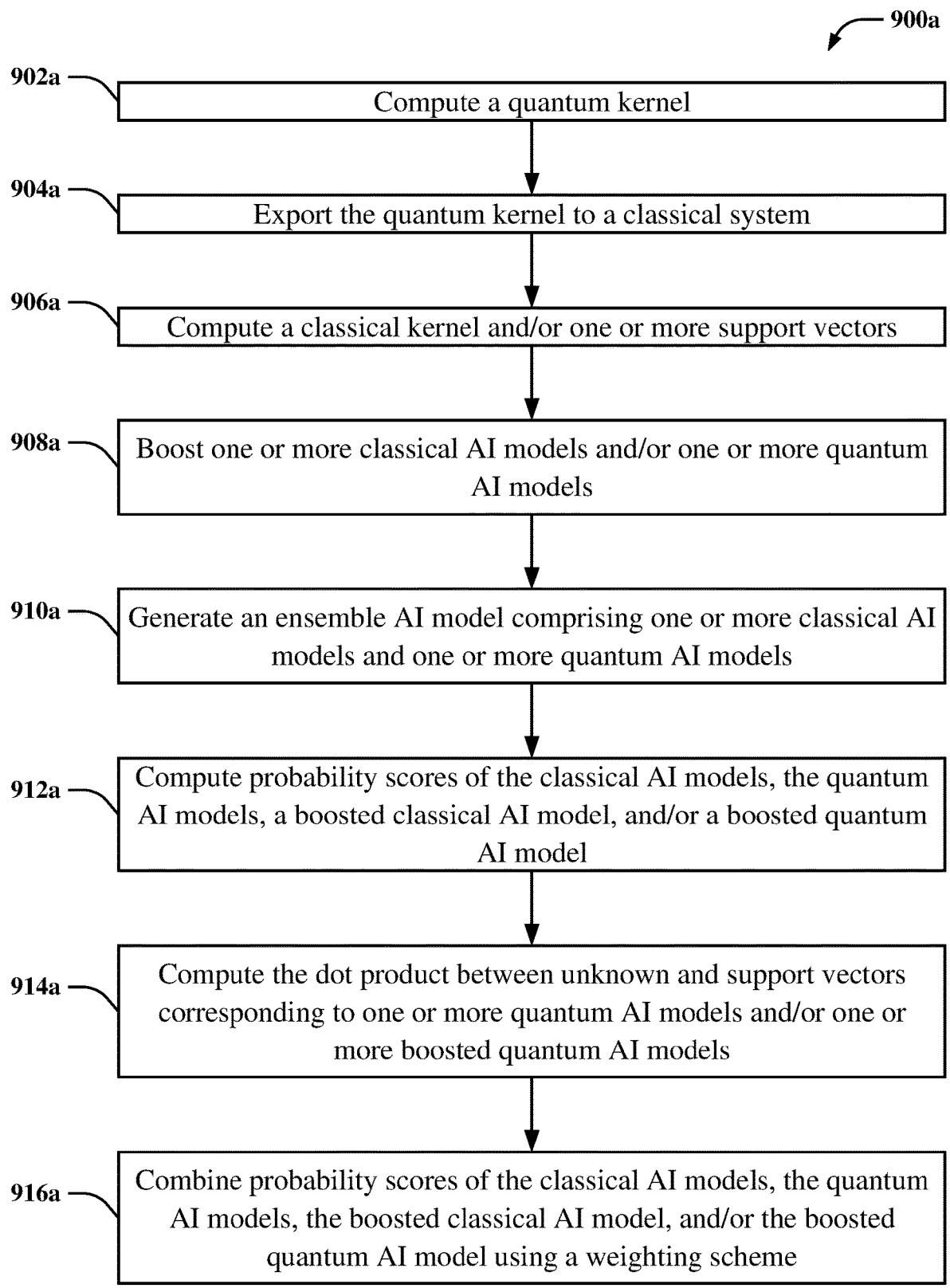
FIG. 9A illustrates a flow diagram of an example, non-limiting computer-implemented method that can facilitate a classical and quantum ensemble artificial intelligence (AI) model in accordance with one or more embodiments described herein.

FIG. 9A illustrates a flow diagram of an example, non-limiting computer-implemented method 900a that can facilitate a classical and quantum ensemble artificial intelligence (AI) model in accordance with one or more embodiments described herein. Repetitive description of like elements and/or processes employed in respective embodiments is omitted for sake of brevity.

In some embodiments, at 902a, computer-implemented method 900a can comprise computing (e.g., via ensemble system 102, quantum computing component 202, etc.) a quantum kernel (e.g., a quantum kernel matrix). For example, ensemble system 102 and/or quantum computing component 202 can compute a quantum kernel matrix using a quantum kernel library.

In some embodiments, at 904a, computer-implemented method 900a can comprise exporting (e.g., via ensemble system 102, quantum computing component 202, classical computing component 204, etc.) the quantum kernel (e.g., quantum kernel matrix) to a classical system (e.g., classical computing component 204).

In some embodiments, at 906a, computer-implemented method 900a can comprise computing (e.g., via ensemble system 102, classical computing component 204, etc.) a classical kernel and/or one or more support vectors. For example, ensemble system 102 and/or classical computing component 204 can employ a radial basis function (RBF) kernel to compute such a classical kernel and/or support vector(s).

In some embodiments, at 908a, computer-implemented method 900a can comprise boosting (e.g., via ensemble system 102, ensemble component 108, boost component 208, etc.) one or more classical AI models and/or one or more quantum AI models. For example, ensemble system 102 and/or boost component 208 can employ a boosting technique (e.g., a boosting algorithm such as, for instance, algorithm 300) to boost one or more classical AI models and/or one or more quantum AI models. In this example, ensemble system 102 and/or boost component 208 can boost one or more classical AI models and/or one or more quantum AI models using the quantum kernel (e.g., quantum kernel matrix) computed at step 902a as described above.

In some embodiments, at 910a, computer-implemented method 900a can comprise generating (e.g., via ensemble system 102, ensemble component 108, etc.) an ensemble AI model comprising one or more classical AI models and one or more quantum AI models.

In some embodiments, at 912a, computer-implemented method 900a can comprise computing (e.g., via ensemble system 102, score component 110, etc.) probability scores of the classical AI models, the quantum AI models, a boosted classical AI model, and/or a boosted quantum AI model.

In some embodiments, at 914a, computer-implemented method 900a can comprise computing (e.g., via ensemble system 102, quantum computing component 202, etc.) the dot product between unknown and support vectors corresponding to one or more quantum AI models and/or one or more boosted quantum AI models.

In some embodiments, at 916a, computer-implemented method 900a can comprise combining (e.g., via ensemble system 102, ensemble component 108, score component 110, etc.) probability scores of the classical AI models, the quantum AI models, the boosted classical AI model, and/or the boosted quantum AI model using a weighting scheme (e.g., as described above with reference to FIGS. 3, 4, and 5).

Figure 9B:
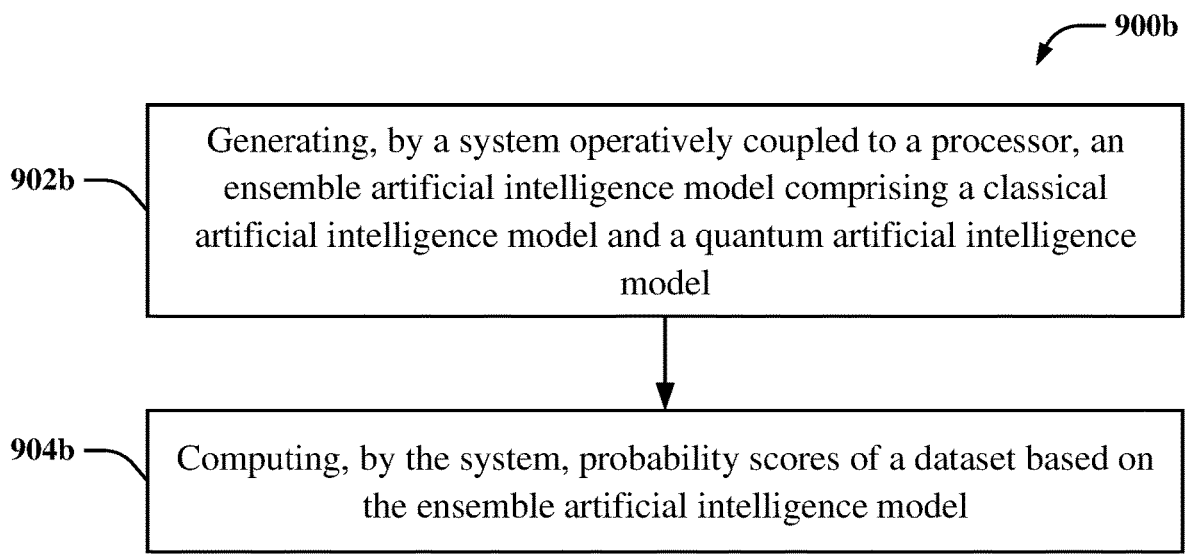
FIG. 9B illustrates a flow diagram of an example, non-limiting computer-implemented method that can facilitate a classical and quantum ensemble artificial intelligence (AI) model in accordance with one or more embodiments described herein.

FIG. 9B illustrates a flow diagram of an example, non-limiting computer-implemented method 900b that can facilitate a classical and quantum ensemble artificial intelligence (AI) model in accordance with one or more embodiments described herein. Repetitive description of like elements and/or processes employed in respective embodiments is omitted for sake of brevity.

In some embodiments, at 902b, computer-implemented method 900b can comprise generating, by a system (e.g., via ensemble system 102, ensemble component 108, boost component 208, etc.) operatively coupled to a processor (e.g., processor 106), an ensemble artificial intelligence model comprising a classical artificial intelligence model (e.g., a single classical AI model, a boosted classical AI model, etc.) and a quantum artificial intelligence model (e.g., a single quantum AI model, a boosted classical AI model, etc.).

In some embodiments, at 904b, computer-implemented method 900b can comprise computing, by the system (e.g., via ensemble system 102, score component 110, etc.), probability scores of a dataset based on the ensemble artificial intelligence model.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
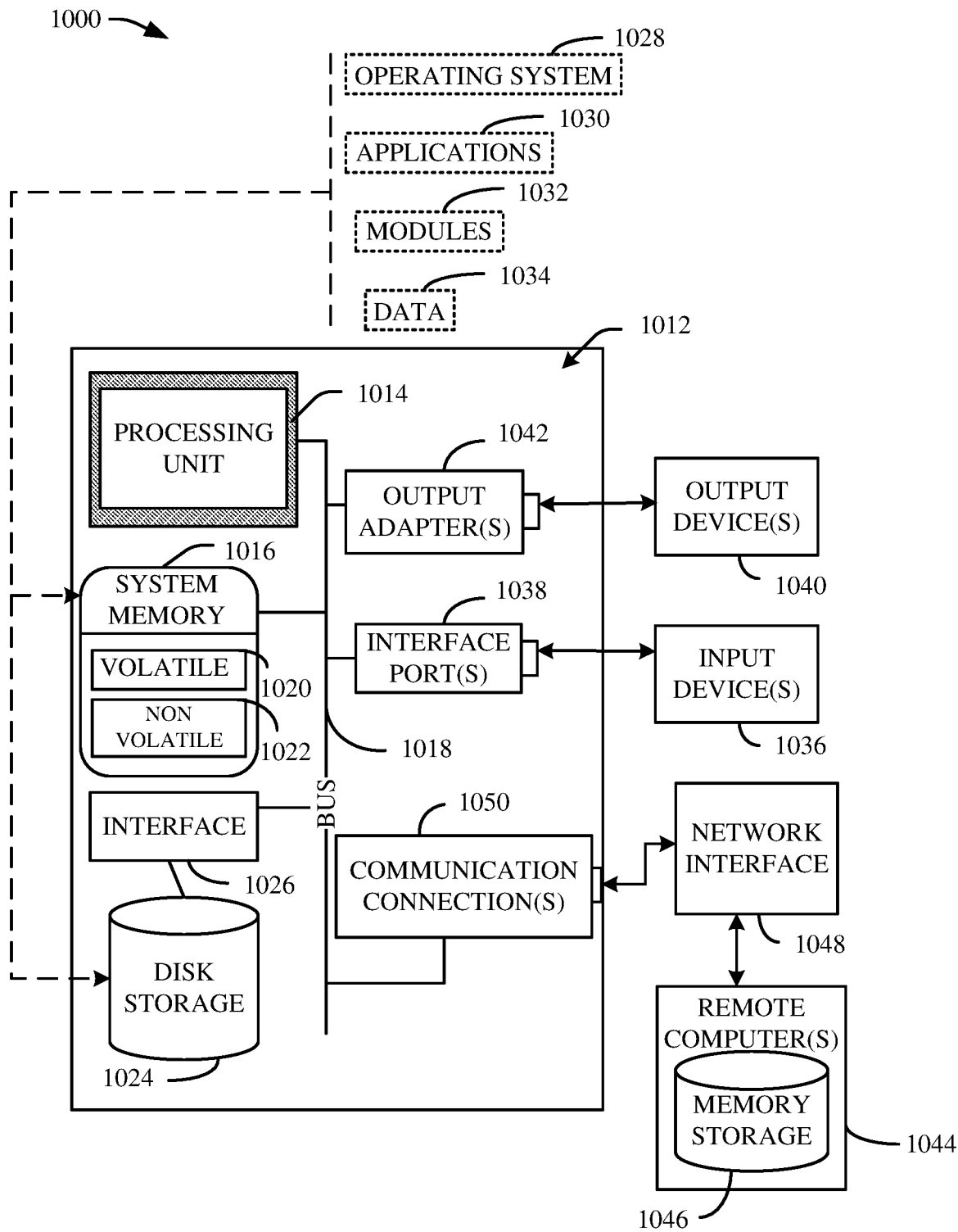
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
an ensemble component that generates an ensemble artificial intelligence model comprising a classical artificial intelligence model and a quantum artificial intelligence model.

2. The system of claim 1, wherein at least one of the classical artificial intelligence model or the quantum artificial intelligence model comprises a boosted artificial intelligence model comprising two or more artificial intelligence models, thereby facilitating at least one of improved probability scores of a dataset or improved processing performance of the processor.

3. The system of claim 1, wherein the computer executable components further comprise:
a quantum computing component that computes at least one of a quantum kernel or one or more quantum support vectors.

4. The system of claim 1, wherein the computer executable components further comprise:
a classical computing component that computes at least one of a classical kernel or one or more classical support vectors, and wherein the classical computing component computes the one or more classical support vectors based on at least one of the classical kernel or a quantum kernel.

5. The system of claim 1, wherein the computer executable components further comprise:
a trainer component that trains the classical artificial intelligence model based on training data and trains the quantum artificial intelligence model based on a subset of the training data.

6. The system of claim 1, wherein the computer executable components further comprise:
a boost component that generates at least one of a boosted classical artificial intelligence model comprising two or more classical artificial intelligence models or a boosted quantum artificial intelligence model comprising two or more quantum artificial intelligence models.

7. The system of claim 1, further comprising:
a score component that computes scores of a dataset based on at least one of the classical artificial intelligence model or the quantum artificial intelligence model.

8. A computer-implemented method, comprising:
generating, by a system operatively coupled to a processor, an ensemble artificial intelligence model comprising a classical artificial intelligence model and a quantum artificial intelligence model.

9. The computer-implemented method of claim 8, wherein at least one of the classical artificial intelligence model or the quantum artificial intelligence model comprises a boosted artificial intelligence model comprising two or more artificial intelligence models, thereby facilitating at least one of improved probability scores of dataset or improved processing performance of the processor.

10. The computer-implemented method of claim 8, further comprising:
computing, by the system, at least one of a quantum kernel or one or more quantum support vectors.

11. The computer-implemented method of claim 8, further comprising:
computing, by the system, at least one of a classical kernel or one or more classical support vectors; and
computing, by the system, the one or more classical support vectors based on at least one of the classical kernel or a quantum kernel.

12. The computer-implemented method of claim 8, further comprising:
training, by the system, the classical artificial intelligence model based on training data; and
training, by the system, the quantum artificial intelligence model based on a subset of the training data.

13. The computer-implemented method of claim 8, further comprising:
generating, by the system, at least one of a boosted classical artificial intelligence model comprising two or more classical artificial intelligence models or a boosted quantum artificial intelligence model comprising two or more quantum artificial intelligence models.

14. The computer-implemented method of claim 8, further comprising:
computing, by the system, scores of a dataset based on at least one of the classical artificial intelligence model or the quantum artificial intelligence model.

15. A computer program product facilitating a classical and quantum ensemble artificial intelligence model, the computer program product comprising a computer readable storage medium having program instructions embodied therewith, the program instructions executable by a processor to cause the processor to:
generate, by the processor, an ensemble artificial intelligence model comprising a classical artificial intelligence model and a quantum artificial intelligence model.

16. The computer program product of claim 15, wherein at least one of the classical artificial intelligence model or the quantum artificial intelligence model comprises a boosted artificial intelligence model comprising two or more artificial intelligence models.

17. The computer program product of claim 15, wherein, the program instructions are further executable by the processor to cause the processor to:
compute, by the processor, at least one of a quantum kernel or one or more quantum support vectors.

18. The computer program product of claim 15, wherein, the program instructions are further executable by the processor to cause the processor to:
compute, by the processor, at least one of a classical kernel or one or more classical support vectors; and
compute, by the processor, the one or more classical support vectors based on at least one of the classical kernel or a quantum kernel.

19. The computer program product of claim 15, wherein, the program instructions are further executable by the processor to cause the processor to:
train, by the processor, the classical artificial intelligence model based on training data; and
train, by the processor, the quantum artificial intelligence model based on a subset of the training data.

20. The computer program product of claim 15, wherein, the program instructions are further executable by the processor to cause the processor to:
generate, by the processor, at least one of a boosted classical artificial intelligence model comprising two or more classical artificial intelligence models or a boosted quantum artificial intelligence model comprising two or more quantum artificial intelligence models.

* * * * *